US012143356B1

(12) United States Patent
Karpuska

(10) Patent No.: US 12,143,356 B1
(45) Date of Patent: *Nov. 12, 2024

(54) CONFLICT RESOLUTION TO ENABLE ACCESS TO LOCAL NETWORK DEVICES VIA MESH NETWORK DEVICES

(71) Applicant: UAB 360 IT, Vilnius (LT)

(72) Inventor: Rytis Karpuska, Vilnius (LT)

(73) Assignee: UAB 360 IT, Vilnius (LT)

( * ) Notice: Subject to any disclaimer, the term of this patent is extended or adjusted under 35 U.S.C. 154(b) by 0 days.

This patent is subject to a terminal disclaimer.

(21) Appl. No.: 18/201,497

(22) Filed: May 24, 2023

Related U.S. Application Data

(63) Continuation of application No. 18/200,505, filed on May 22, 2023.

(51) Int. Cl.
| | |
|---|---|
| *G06F 15/16* | (2006.01) |
| *H04L 61/2503* | (2022.01) |
| *H04L 61/5046* | (2022.01) |
| *H04L 101/668* | (2022.01) |

(52) U.S. Cl.
CPC ...... *H04L 61/5046* (2022.05); *H04L 61/2503* (2013.01); *H04L 2101/668* (2022.05)

(58) Field of Classification Search
CPC ............. H04L 61/5046; H04L 61/5092; H04L 61/2503; H04L 2101/668
USPC .......................... 709/202–203, 245–246, 249
See application file for complete search history.

(56) References Cited

U.S. PATENT DOCUMENTS

| | | | |
|---|---|---|---|
| 6,925,079 B2 * | 8/2005 | Matsukawa | H04L 61/5046 370/389 |
| 7,660,318 B2 | 2/2010 | Rahman et al. | |
| 7,986,663 B2 * | 7/2011 | Tsubota | H04W 72/02 370/461 |
| 8,098,659 B2 | 1/2012 | Shida | |
| 9,143,929 B1 | 9/2015 | Chen et al. | |
| 9,210,034 B2 * | 12/2015 | Gil | H04L 61/5092 |
| 9,787,503 B2 | 10/2017 | Moreman | |
| 9,806,970 B2 * | 10/2017 | Sabet | H04L 61/5014 |
| 10,708,225 B2 * | 7/2020 | Gopalasetty | H04L 61/5046 |
| 10,965,637 B1 * | 3/2021 | Nayak | H04L 61/5092 |
| 11,509,626 B2 * | 11/2022 | Maddu | H04L 61/5046 |
| 12,003,479 B1 * | 6/2024 | Karpuska | H04L 61/5046 |
| 2006/0177063 A1 | 8/2006 | Conway et al. | |
| 2008/0198858 A1 | 8/2008 | Townsley et al. | |
| 2013/0346620 A1 | 12/2013 | Gizis et al. | |
| 2017/0257311 A1 | 9/2017 | Sharma et al. | |

* cited by examiner

*Primary Examiner* — Bharat Barot
(74) *Attorney, Agent, or Firm* — The Pattani Law Group

(57) ABSTRACT

A method in a mesh network including a first device connected to a first LAN and a second device connected to a second LAN, comprising: configuring the first device to determine that a first subnet IP address assigned to a first LAN device matches a second subnet IP address assigned to a second LAN device; configuring the first device to map an association between an alternate IP address and the first subnet IP address; configuring the first device to receive an initiation network packet to be transmitted by the first device to the first LAN device, the initiation network packet indicating the alternate IP address as a destination address; and configuring the first device to transmit the initiation network packet to the first LAN device over a first LAN connection is disclosed. Various other aspects are contemplated.

20 Claims, 8 Drawing Sheets

CONFLICT RESOLUTION TO ENABLE ACCESS TO LOCAL NETWORK DEVICES VIA MESH NETWORK DEVICES

CROSS REFERENCE

This application is a continuation of U.S. Non-Provisional patent application Ser. No. 18/200,505, filed on May 22, 2023, and titled "CONFLICT RESOLUTION TO ENABLE ACCESS TO LOCAL NETWORK DEVICES VIA MESH NETWORK DEVICES," the entire contents of which are incorporated herein by reference.

FIELD OF DISCLOSURE

Aspects of the present disclosure generally relate to communications in networks, and more particularly to conflict resolution to enable access to local network devices via mesh network devices.

BACKGROUND

Users may rely on mesh networks (also referred to as "meshnets") to communicate (e.g., transmit and/or receive) data among a plurality of meshnet devices (e.g., user devices) via one or more Internet nodes (e.g., bridges, switches, infrastructure devices, etc.). In an example, a mesh network may include a plurality of meshnet devices communicatively coupled to each other directly or via the one or more Internet nodes. A mesh network in which all meshnet devices are communicatively coupled to each other may be referred to as a fully connected network. Data transmitted by a first meshnet device, from among the plurality of meshnet devices, may be routed over the Internet via the one or more Internet nodes to a second meshnet device from among the plurality of meshnet devices. Also, data transmitted by the first meshnet device may be routed to two or more meshnet devices from among the plurality of meshnet devices.

In a mesh network, the plurality of meshnet devices may cooperate with each other to enable communication of the data among the plurality of meshnet devices. In an example, one or more of the meshnet devices may participate in communication of the data. In this way, the mesh network may avoid relying on a given meshnet device for communication of the data. Some mesh networks may have the ability to dynamically self-organize and self-configure the plurality of meshnet devices. This ability may allow such mesh networks to enable dynamic distribution of workloads, particularly in the event that one or more meshnet devices should fail. Further, installation overhead may be reduced.

SUMMARY

In one aspect, the present disclosure contemplates a method in a mesh network including a first meshnet device in communication with a second meshnet device, the first meshnet device being connected to a first local area network (LAN) and the second meshnet device being connected to a second LAN, the method comprising: determining, by the first meshnet device, a first range of first subnet internet protocol (IP) addresses associated with the first LAN, and a second range of second subnet IP addresses associated with the second LAN; determining, by the first meshnet device based at least in part on comparing the first range with the second range, a conflict that a first subnet IP address assigned to a first LAN device in the first LAN matches a second subnet IP address assigned to a second LAN device in the second LAN; mapping, by the first meshnet device based at least in part on determining the conflict, an association between an alternate IP address and the first subnet IP address; transmitting, by the first meshnet device to the second meshnet device, the association between the alternate IP address and the first subnet IP address; and receiving, by the first meshnet device from the second meshnet device, an initiation network packet to be transmitted by the first meshnet device to the first LAN device, the initiation network packet indicating the alternate IP address as a destination address.

In another aspect, the present disclosure contemplates a meshnet device in communication with a second meshnet device in a mesh network, the first meshnet device being connected to a first local area network (LAN) and the second meshnet device being connected to a second LAN, the first meshnet device comprising: a memory; and a processor communicatively coupled to the memory, the memory and the processor being configured to: determine a first range of first subnet internet protocol (IP) addresses associated with the first LAN, and a second range of second subnet IP addresses associated with the second LAN; determine, based at least in part on comparing the first range with the second range, a conflict that a first subnet IP address assigned to a first LAN device in the first LAN matches a second subnet IP address assigned to a second LAN device in the second LAN; map, based at least in part on determining the conflict, an association between an alternate IP address and the first subnet IP address; transmit, to the second meshnet device, the association between the alternate IP address and the first subnet IP address; and receive, from the second meshnet device, an initiation network packet to be transmitted by the first meshnet device to the first LAN device, the initiation network packet indicating the alternate IP address as a destination address.

In another aspect, the present disclosure contemplates a non-transitory computer-readable medium configured to store instructions, which when executed by a processor associated with a first meshnet device in communication with a second meshnet device in a mesh network, the first meshnet device being connected to a first local area network (LAN) and the second meshnet device being connected to a second LAN, configure the processor to: determine a first range of first subnet internet protocol (IP) addresses associated with the first LAN, and a second range of second subnet IP addresses associated with the second LAN; determine, based at least in part on comparing the first range with the second range, a conflict that a first subnet IP address assigned to a first LAN device in the first LAN matches a second subnet IP address assigned to a second LAN device in the second LAN; map, based at least in part on determining the conflict, an association between an alternate IP address and the first subnet IP address; transmit, to the second meshnet device, the association between the alternate IP address and the first subnet IP address; and receive, from the second meshnet device, an initiation network packet to be transmitted by the first meshnet device to the first LAN device, the initiation network packet indicating the alternate IP address as a destination address.

It is to be understood that both the foregoing general description and the following detailed description are exemplary and explanatory in nature and are intended to provide an understanding of the present disclosure without limiting the scope thereof. In that regard, additional aspects, features, and advantages of the present disclosure will be apparent to one skilled in the art from the following detailed description.

BRIEF DESCRIPTION OF THE DRAWINGS

The accompanying drawings illustrate aspects of systems, devices, methods, and/or mediums disclosed herein and together with the description, serve to explain the principles of the present disclosure. Throughout this description, like elements, in whatever aspect described, refer to common elements wherever referred to and referenced by the same reference number. The characteristics, attributes, functions, interrelations ascribed to a particular element in one location apply to those elements when referred to by the same reference number in another location unless specifically stated otherwise.

The figures referenced below are drawn for ease of explanation of the basic teachings of the present disclosure; the extensions of the figures with respect to number, position, relationship, and dimensions of the parts to form the following aspects may be explained or may be within the skill of the art after the following description has been read and understood. Further, exact dimensions and dimensional proportions to conform to specific force, weight, strength, and similar requirements will likewise be within the skill of the art after the following description has been read and understood.

The following is a brief description of each figure used to describe the present disclosure, and thus, is being presented for illustrative purposes only and should not be limitative of the scope of the present disclosure.

Figure 1:
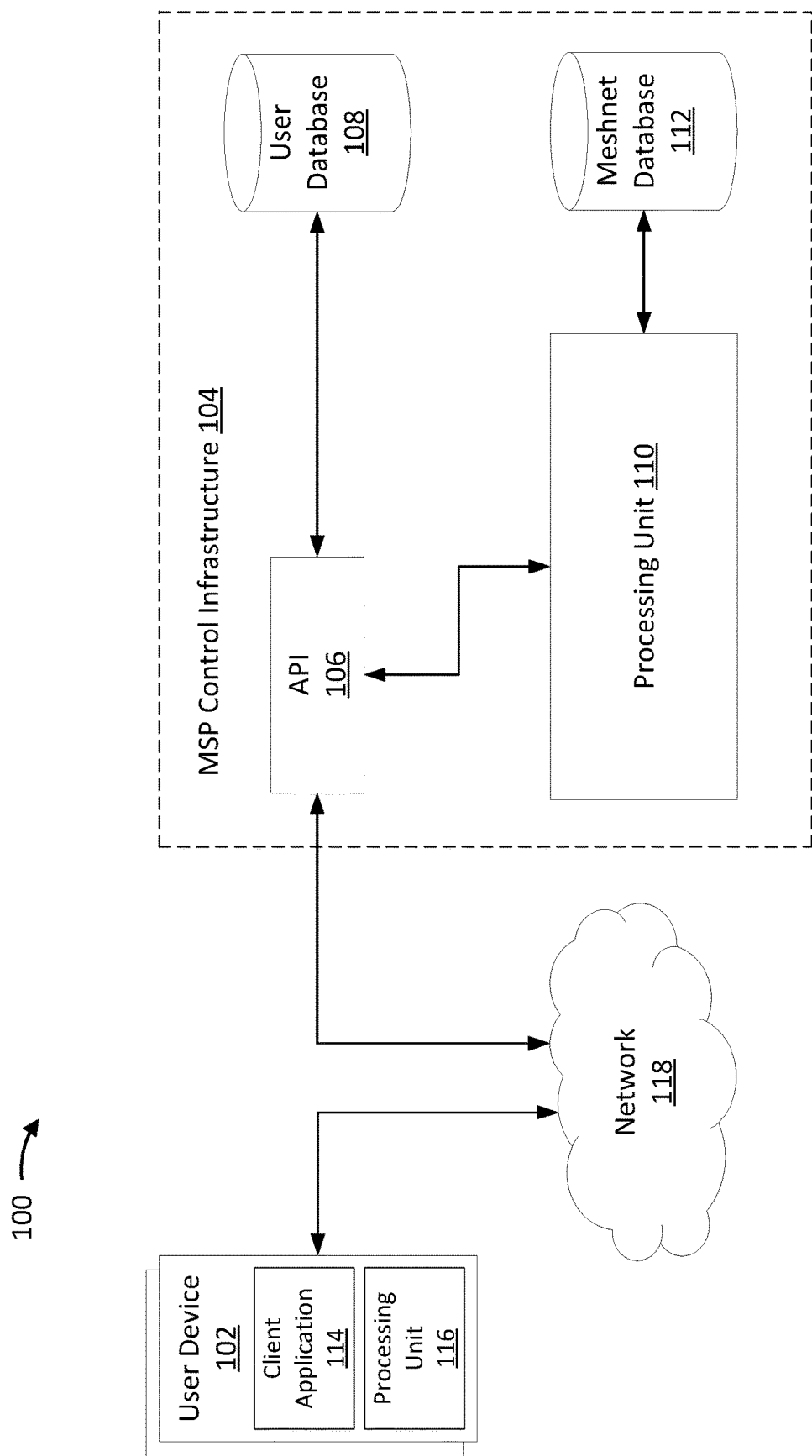

FIG. 1 is an illustration of an example system associated with conflict resolution to enable access to local network devices via mesh network devices, according to various aspects of the present disclosure.

Figure 2:
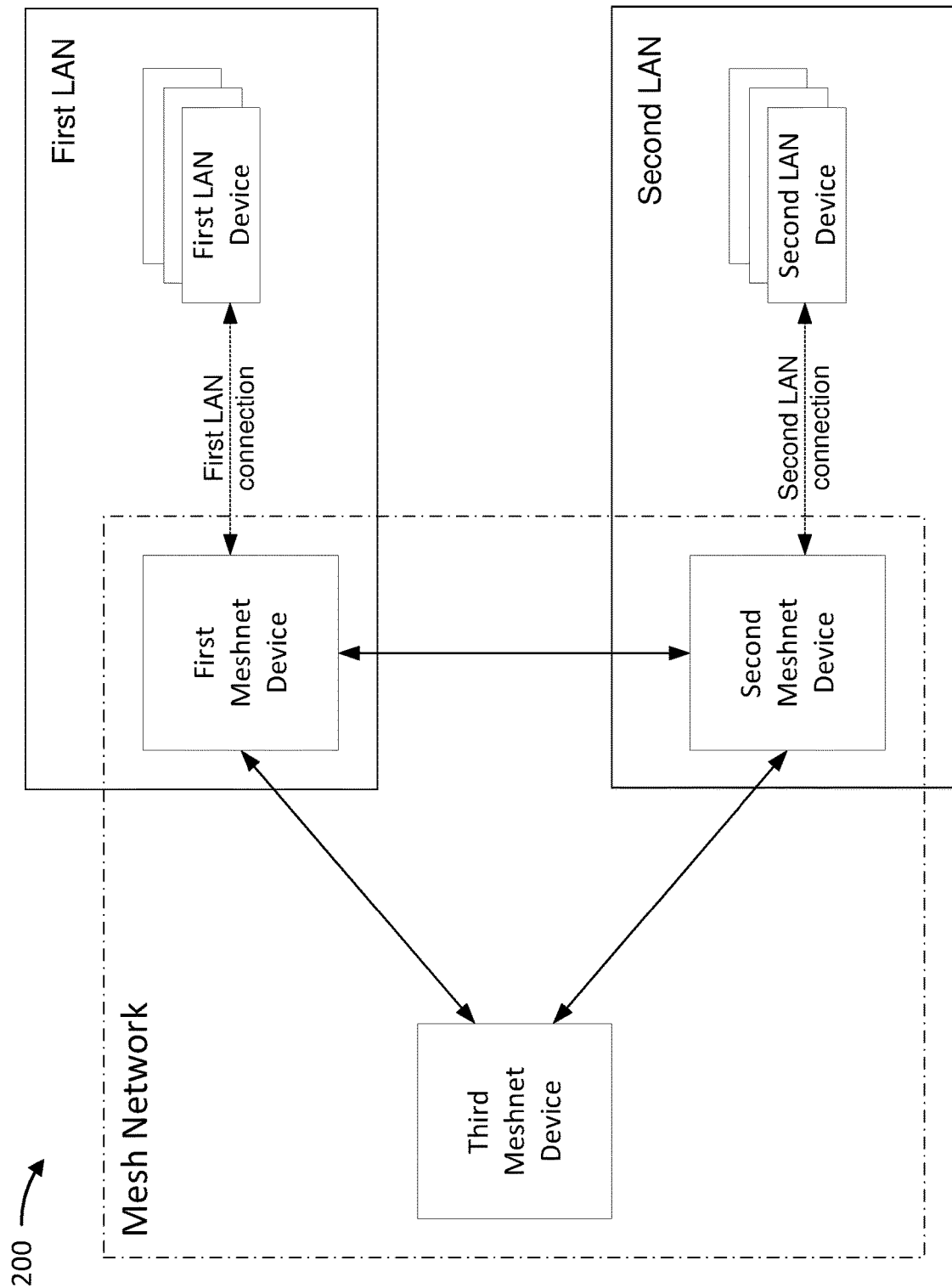

FIG. 2 is an illustration of an example associated with conflict resolution to enable access to local network devices via mesh network devices, according to various aspects of the present disclosure.

Figure 3:
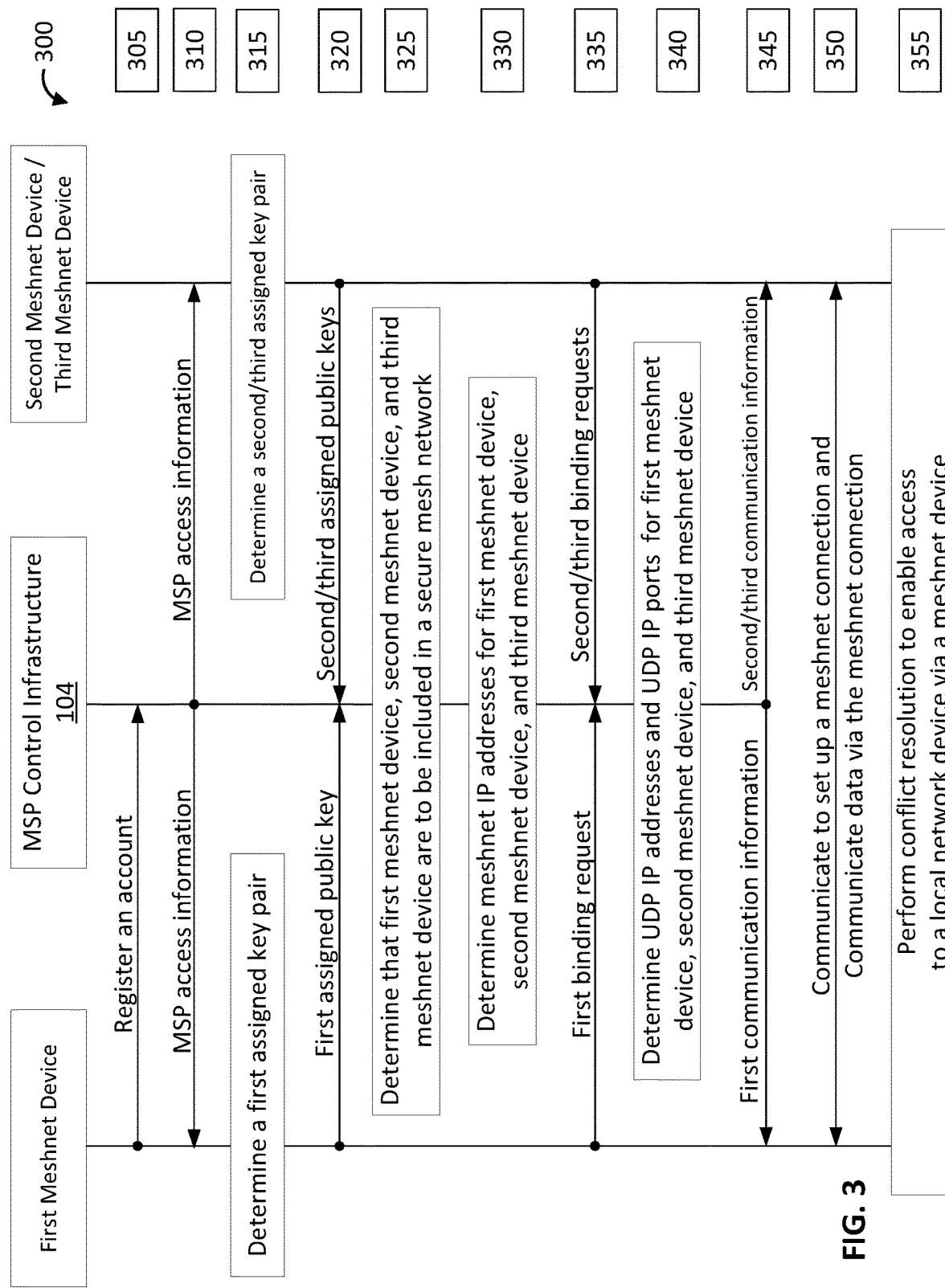

FIG. 3 is an illustration of an example flow associated with conflict resolution to enable access to local network devices via mesh network devices, according to various aspects of the present disclosure.

Figure 4:
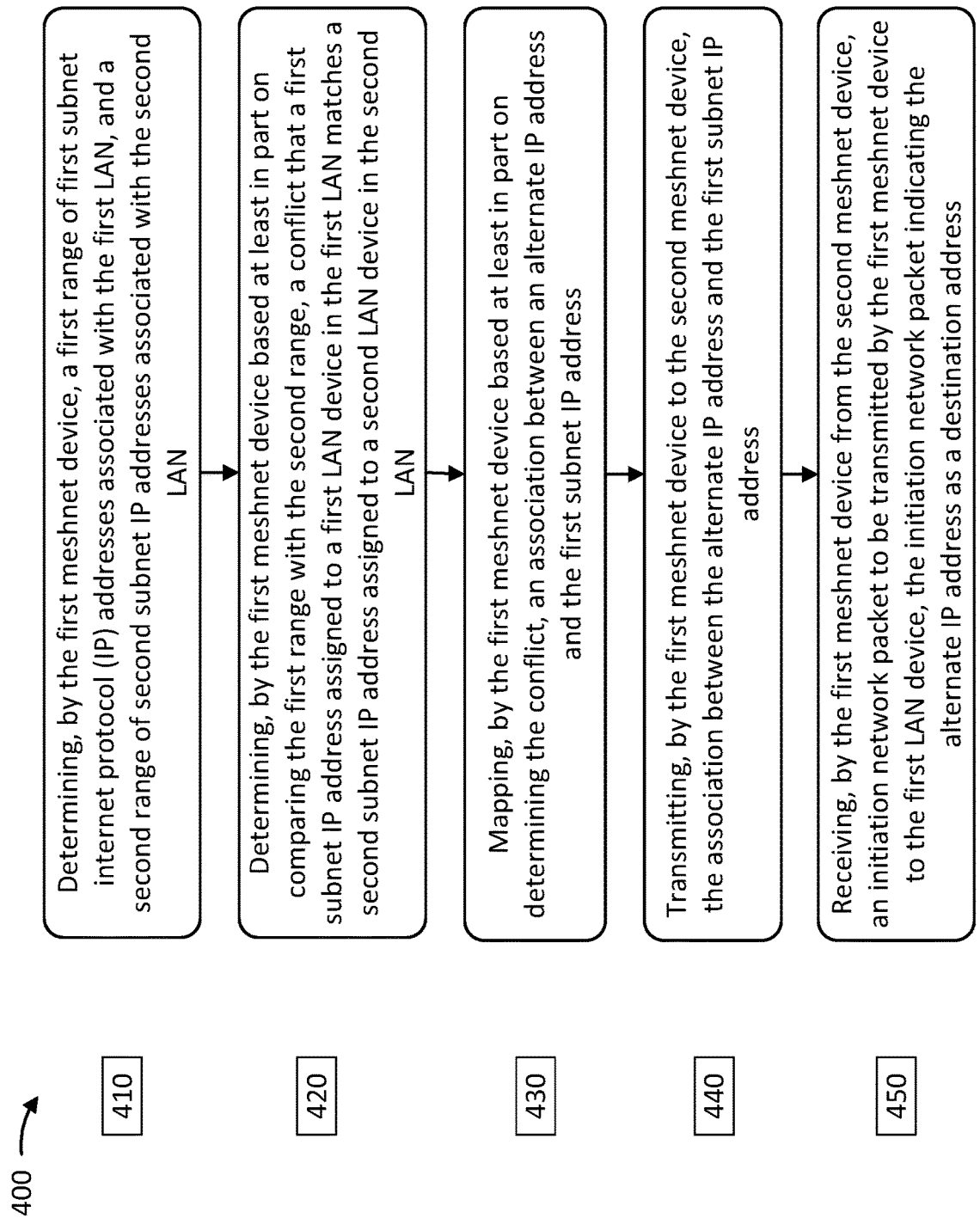

FIG. 4 is an illustration of an example process associated with conflict resolution to enable access to local network devices via mesh network devices, according to various aspects of the present disclosure.

Figure 5:
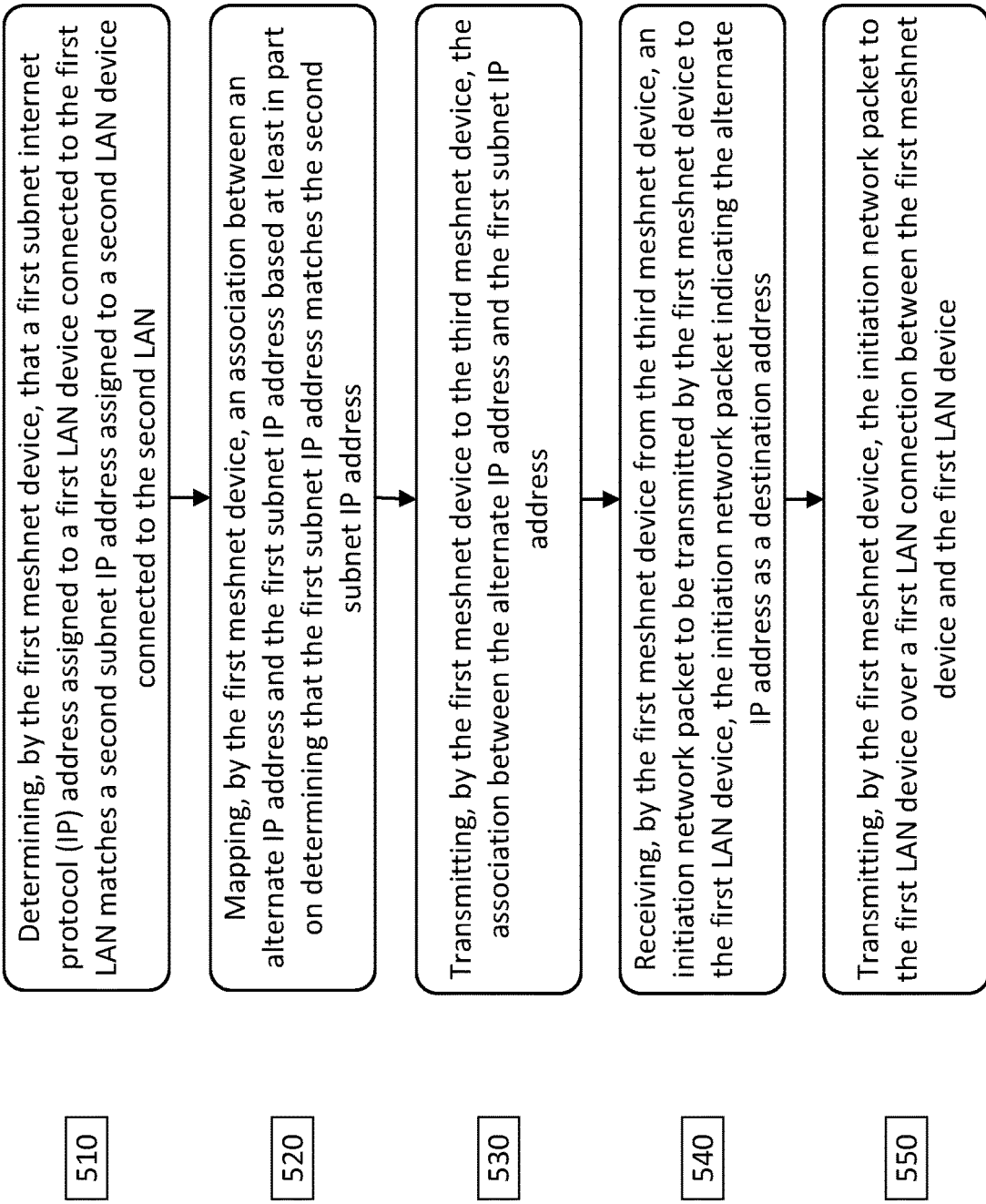

FIG. 5 is an illustration of an example process associated with conflict resolution to enable access to local network devices via mesh network devices, according to various aspects of the present disclosure.

Figure 6:
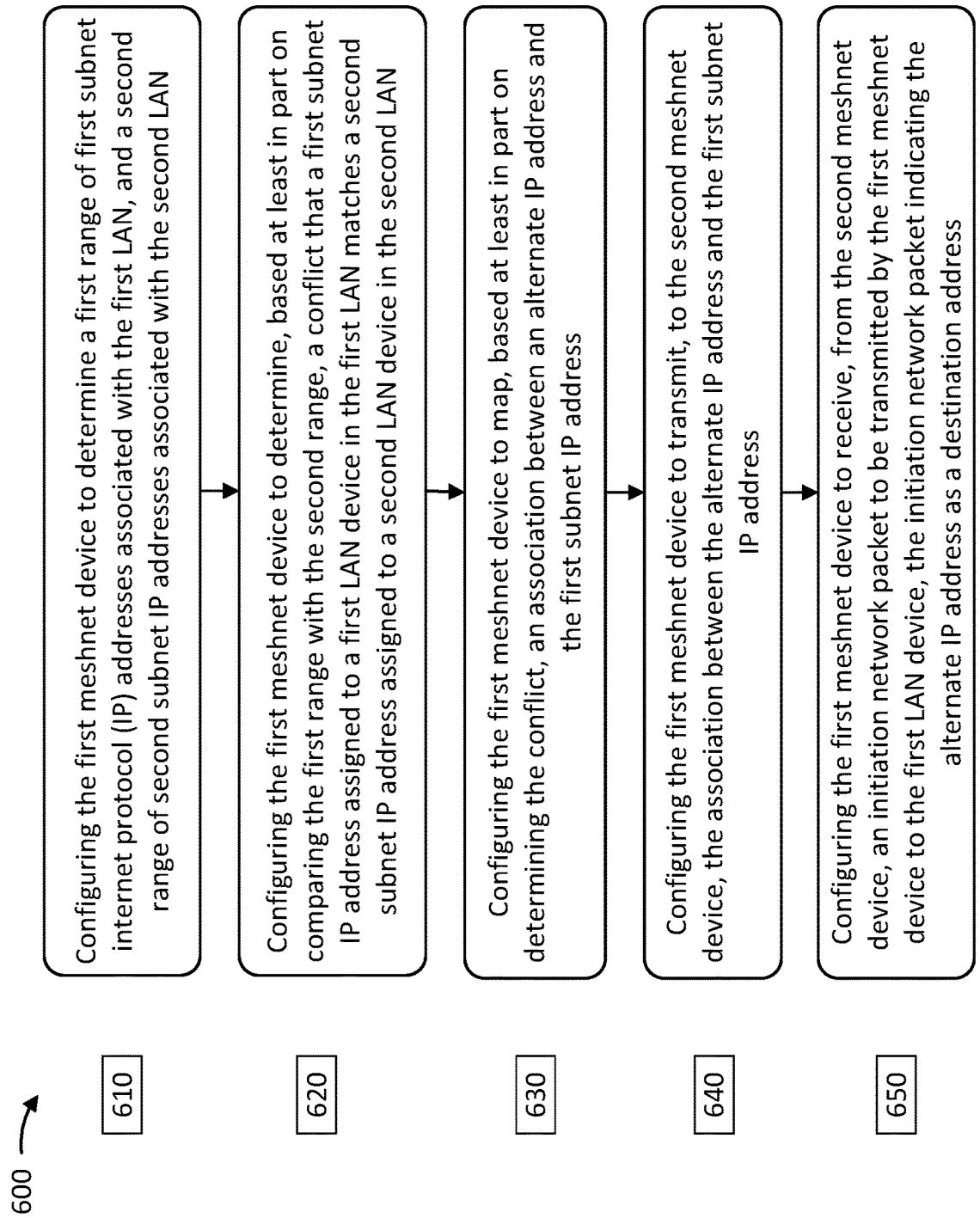

FIG. 6 is an illustration of an example process associated with conflict resolution to enable access to local network devices via mesh network devices, according to various aspects of the present disclosure.

Figure 7:
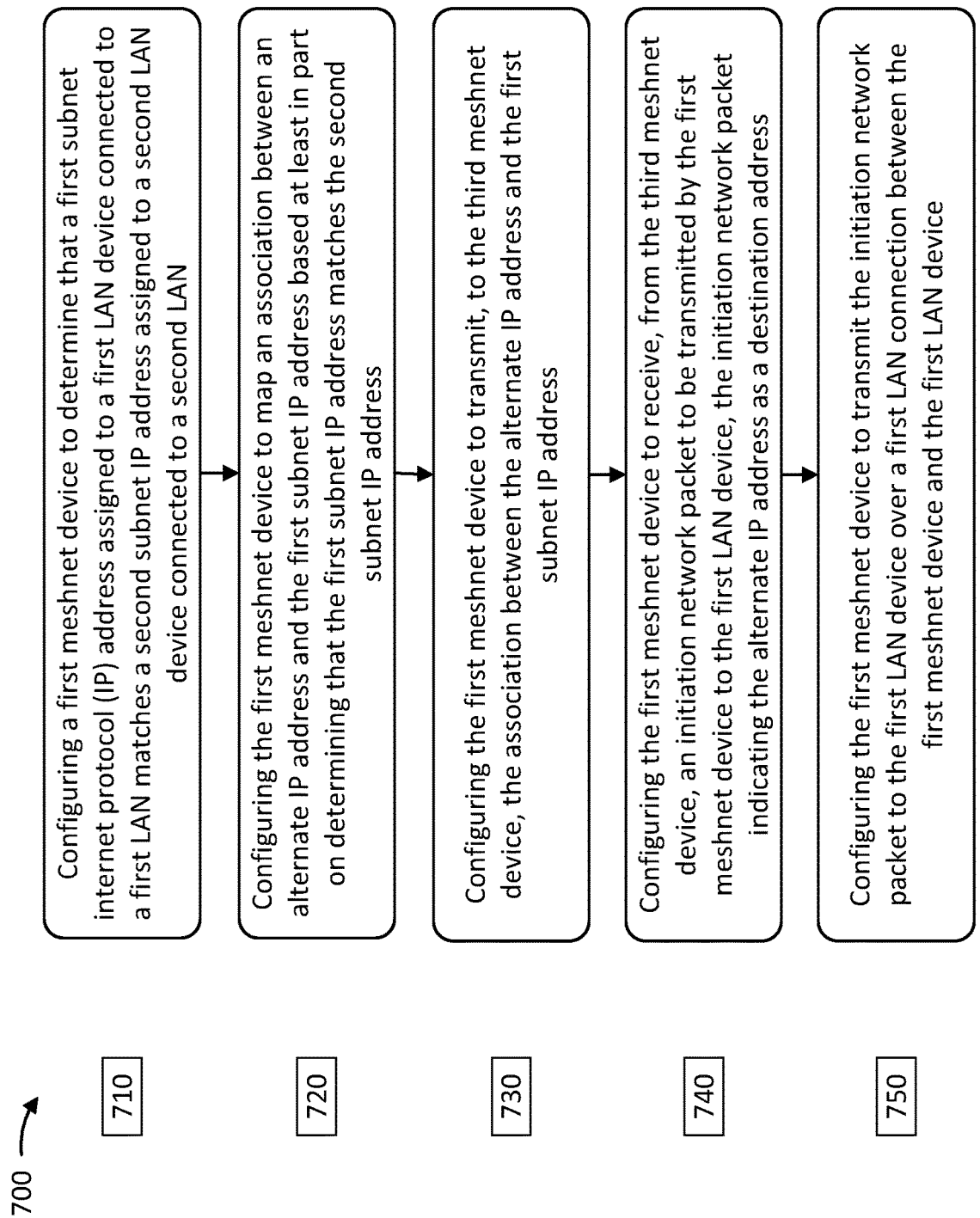

FIG. 7 is an illustration of an example process associated with conflict resolution to enable access to local network devices via mesh network devices, according to various aspects of the present disclosure.

Figure 8:
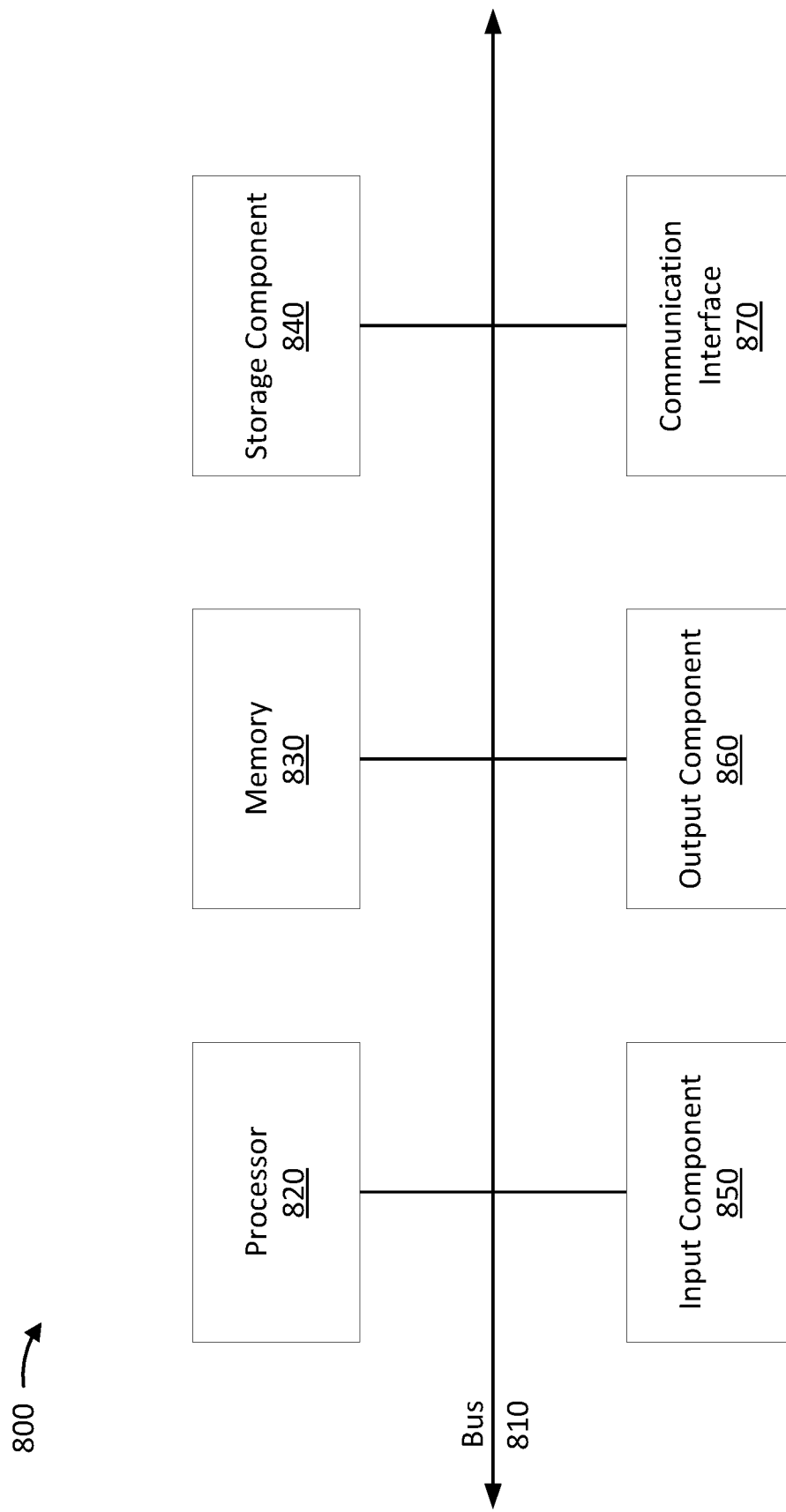

FIG. 8 is an illustration of example devices associated with conflict resolution to enable access to local network devices via mesh network devices, according to various aspects of the present disclosure.

DETAILED DESCRIPTION

For the purposes of promoting an understanding of the principles of the present disclosure, reference will now be made to the aspects illustrated in the drawings, and specific language may be used to describe the same. It will nevertheless be understood that no limitation of the scope of the disclosure is intended. Any alterations and further modifications to the described devices, instruments, methods, and any further application of the principles of the present disclosure are fully contemplated as would normally occur to one skilled in the art to which the disclosure relates. In particular, it is fully contemplated that the features, components, and/or steps described with respect to one aspect may be combined with the features, components, and/or steps described with respect to other aspects of the present disclosure. For the sake of brevity, however, the numerous iterations of these combinations may not be described separately. For simplicity, in some instances the same reference numbers are used throughout the drawings to refer to the same or like parts.

FIG. 1 is an illustration of an example 100 associated with conflict resolution to enable access to local network devices via mesh network devices, according to various aspects of the present disclosure. Example 100 shows an architectural depiction of included components. In some aspects, the components may include one or more user devices 102 capable of communicating with a mesh network service provider (MSP) control infrastructure 104 for purposes of obtaining mesh network services. In some aspects, the one or more user devices 102 may communicate with the MSP control infrastructure 104 over a network 118. The MSP control infrastructure 104 may be controlled by a mesh network service provider and may include an application programming interface (API) 106, a user database 108, processing unit 110, and a meshnet database 112. In some aspects, a user device 102 may utilize a processing unit 116 and/or a client application 114, which may be provided by the MSP control infrastructure 104, to communicate with the API 106. The API 106 may be capable of communicating with the user database 108 and with the processing unit 110. Additionally, the processing unit 110 may be capable of communicating with the meshnet database 112, which may be capable of storing data associated with providing mesh network services.

The user device 102 may be a physical computing device capable of hosting the client application 114 and of connecting to the network 118. The user device 102 may be, for example, a laptop, a mobile phone, a tablet computer, a desktop computer, a smart device, a router, or the like. In some aspects, the user device 102 may include, for example, Internet-of-Things (IoT) devices such as MSP enabled smart home appliances, smart home security systems, autonomous vehicles, smart health monitors, smart factory equipment, wireless inventory trackers, biometric cyber security scanners, or the like. The network 118 may be any digital telecommunication network that permits several nodes to share and access resources. In some aspects, the network 118 may include one or more of networks, for example, a local-area network (LAN), a wide-area network (WAN), a campus-area network (CAN), a metropolitan-area network (MAN), a home-area network (HAN), Internet, Intranet, Extranet, and Internetwork.

The MSP control infrastructure 104 may include a combination of hardware and software components that enable provision of mesh network services to the user device 102. The MSP control infrastructure 104 may interface with (the client application on) the user device 102 via the API 106, which may include one or more endpoints to a defined request-response message system. In some aspects, the API 106 may be configured to receive, via the network 118, a connection request from the user device 102 to establish a connection with the MSP control infrastructure 104 for purposes of obtaining the mesh network services. The connection request may include an authentication request to authenticate the user device 102 as a subscriber of the mesh network services. The API 106 may receive the authentication request and a request for the mesh network services in a single connection request. In some aspects, the API 106 may receive the authentication request and the request for the mesh network services in separate connection requests.

The API 106 may further be configured to handle the connection request by mediating the authentication request. For instance, the API 106 may receive from the user device 102 credentials including, for example, a unique combination of a user ID and password for authenticating the user device 102. In another example, the credentials may include a unique validation code known to an authorized user. The API 106 may provide the received credentials to the user database 108 for verification.

The user database 108 may include a structured repository of valid credentials belonging to authorized users. In one example, the structured repository may include one or more tables containing valid unique combinations of user IDs and passwords belonging to authorized users. In another example, the structured repository may include one or more tables containing valid unique validation codes associated with authentic users. The mesh network service provider may add or delete such valid unique combinations of user IDs and passwords from the structured repository at any time. Based at least in part on receiving the credentials from the API 106, the user database 108 and a processor (e.g., the processing unit 110 or another local or remote processor) may verify the received credentials by matching the received credentials with the valid credentials stored in the structured repository. In some aspects, the user database 108 and the processor may authenticate the user device 102 when the received credentials match at least one of the valid credentials. In this case, the mesh network service provider may provide mesh network services to the user device 102. When the received credentials fail to match at least one of the valid credentials, the user database 108 and the processor may fail to authenticate the user device 102. In this case, the mesh network service provider may decline to provide mesh network services to the user device 102.

When the user device 102 is authenticated, the user device 102 may initiate a connection and may transmit to the API 106 another connection request for the mesh network services. The processing unit 110 included in the MSP control infrastructure 104 may be configured to determine a mesh network associated with the user device 102 and/or to identify one or more user devices to be included within the determined mesh network. The processing unit 110 may utilize the API 106 to transmit information associated with the mesh network and/or the identified one or more user devices to the user device 102. The user device 102 may transmit an initiation request to establish secure connections (e.g., encrypted tunnels) with the one or more user devices. In some aspects, the one or more user devices with which the user device 102 establishes the secure connections may also host respective client applications for communicating with the MSP control infrastructure 104 and/or with the user device 102. In some aspects, the processing unit 110 may be a logical unit including a logical component configured to perform complex operations associated with computing, for example, numerical weights related to various factors associated with providing the meshnet services.

One or more components (e.g., API 106, user database 108, processing unit 110, and/or meshnet database 112, processing unit 116) included in the MSP control infrastructure 104 and/or included in the user device 102 may further be associated with a controller/processor, a memory, a communication interface, or a combination thereof (e.g., FIG. 8). For instance, the one or more components may include or may be included in a controller/processor, a memory, or a combination thereof. In some aspects, the one or more components may be separate and distinct from each other. Alternatively, in some aspects, the one or more components may be combined with another one of the one or more components. In some aspects, the one or more may be local with respect to each other. Alternatively, in some aspects, the one or more components may be located remotely with another one of the one or more components. Additionally, or alternatively, the one or more components may be implemented at least in part as software stored in a hardware memory. For example, a component (or a portion of a component) may be implemented as instructions or code stored in a non-transitory computer-readable medium and executable by a controller or a processor to perform the functions or operations of the component. Additionally, or alternatively, the one or more components shown in FIG. 1 may be configured to perform one or more functions described as being performed by another one of the one or more components shown in FIG. 1.

As indicated above, FIG. 1 is provided as an example. Other examples may differ from what is described with regard to FIG. 1.

User devices (e.g., meshnet devices) may be included in a mesh network and may rely on the mesh network to communicate (e.g., transmit and/or receive) meshnet data with each other. In example 200 shown in FIG. 2, the meshnet devices may include a first user device, a second user device, and a third user device. The meshnet data may be communicated using wired communications and/or wireless communications over a network such as, for example, the Internet. The meshnet data may include information including digital information such as, for example, documents including data, voice data, image data, signal data, and/or video data. Further, the mesh network may be a secure mesh network that may enable the meshnet devices to communicate the meshnet data in encrypted form via meshnet connections (shown as double-ended arrows in FIG. 2).

In some cases, one or more meshnet devices (e.g., the first meshnet device and/or the third meshnet device) may be associated with a first LAN (e.g., home network), which may also include one or more first LAN devices such as, for example, smart devices. In an example, when connected to the home network, the one or more meshnet devices may communicate (e.g., transmit and/or receive information) with a smart device to monitor and/or control functions performed by the smart device (e.g., security camera, refrigerator, lights, etc.). To enable communication among the devices connected to the home network, the home network may respectively assign first subnet IP addresses to each device connected to the home network. The first LAN may freely select a first range of first subnet IP addresses from a pool of subnet IP addresses reserved for use by LANs. In this case, a meshnet device (e.g., third meshnet device) may utilize a respective subnet IP address assigned to the meshnet device and a respective subnet IP address assigned to the smart device to communicate with the smart device, thereby monitoring and/or controlling functions performed by the smart device.

But, when disconnected from the home network, the meshnet device (e.g., third meshnet device) may no longer have an assigned respective subnet IP address. Also, a device outside the home network may not be able to utilize the respective subnet IP address assigned to the smart device to communicate with the smart device. Additionally, the meshnet device may be unable to utilize a previously utilized subnet IP address because subnet IP addresses may change over time (for example, due to change in location) and the previously utilized subnet IP address may not be currently assigned to the smart device. In these cases, the meshnet device may be unable to communicate with and/or monitor and/or control the functions performed by the smart device. The meshnet device may be disconnected from the home network when, for example, the meshnet device may be located remotely with respect to the home network.

Similarly, one or more meshnet devices (e.g., second meshnet device and/or third meshnet device) may be associated with a second LAN shown in FIG. 2 (e.g., business network), which may also include one or more second LAN devices such as, for example, business devices and/or resources (e.g., network assisted storage unit, server, scanner, printer, etc.). In an example, when connected to the business network, the one or more meshnet devices may communicate (e.g., transmit and/or receive information) with a device and/or resource to perform functions associated with the business. To enable communication among the devices connected to the business network, the business network may respectively assign second subnet IP addresses to each device connected to the business network. The second LAN may freely select a second range of second subnet IP addresses from the pool of subnet IP addresses reserved for use by LANs. In this case, a meshnet device (e.g., third meshnet device) may utilize a respective subnet IP address assigned to the meshnet device and a respective subnet IP address assigned to the business device and/or resource to communicate therewith, thereby performing functions associated with the business.

But, when disconnected from the business network, a meshnet device (e.g., third meshnet device) may no longer have an assigned respective subnet IP address. Also, a device outside the business network may not be able to utilize the respective subnet IP address assigned to the business device and/or resource to communicate with the smart device. Additionally, the meshnet device may be unable to utilize a previously utilized subnet IP address because subnet IP addresses may change over time and the previously utilized subnet IP address may not be currently assigned to the business device and/or resource. In these cases, the meshnet device may be unable to communicate with and/or perform functions associated with the business device and/or resource. The meshnet device may be disconnected from the business network when, for example, the meshnet device may be located remotely with respect to the business network.

In some cases, one or more of the first subnet IP addresses may be the same as one or more of the second subnet IP addresses. For instance, a first subnet IP address assigned to a first LAN device may be the same as a second subnet IP address assigned to a second LAN device. This may occur when, for example, the first range of first subnet IP addresses freely selected for utilization by the home network overlaps with the second range of second subnet IP addresses freely selected for utilization by the business network.

In this case, when a meshnet device intends to communicate with, for example, the first LAN device, the meshnet device may inadvertently transmit a packet to the second LAN device (via the second meshnet device) due to the first subnet IP address and the second subnet IP address being the same. Based at least in part on realizing that the packet was miscommunicated, the meshnet device may retransmit the packet to the first LAN device (via the first meshnet device). Similarly, when the meshnet device intends to communicate with, for example, the second LAN device, the meshnet device may inadvertently transmit a packet to the first LAN device (via the first meshnet device) due to the first subnet IP address and the second subnet IP address being the same. Based at least in part on realizing that the packet was miscommunicated, the meshnet device may retransmit the packet to the second LAN device (via the second meshnet device).

Such inadvertent transmission of packets and/or retransmission of packets may inefficiently consume meshnet device resources (e.g., processing power, memory consumption, battery life, or the like) and mesh network and/or LAN resources (e.g., management resources, bandwidth, processing power, memory consumption, or the like) that may be otherwise be utilized to perform tasks associated with the mesh network and/or the LAN. Additionally, a delay may be introduced in communicating with the intended LAN device.

Various aspects of systems and techniques discussed in the present disclosure enable conflict resolution to enable access to local network devices via mesh network devices. In some aspects, an MSP control infrastructure may provide the mesh network to enable meshnet devices to securely communicate meshnet data. Further, the MSP control infrastructure may provide the meshnet devices with respective client applications to communicate with the MSP control infrastructure, to communicate with each other for setting up respective meshnet connections to be utilized for communicating meshnet data in the mesh network, and/or to communicate the meshnet data with each other over the respective meshnet connections. The MSP control infrastructure and the respective client applications may also enable conflict resolution to enable access to local network devices via meshnet devices. In some aspects, the meshnet devices may exchange connection information regarding respective LANs (e.g., LAN information) associated with the meshnet devices.

In an example, a first meshnet device may transmit to all meshnet devices first LAN information associated with a first LAN to which the first meshnet device is connected. Based at least in part on receiving the first LAN information, a meshnet device (e.g., second meshnet device and/or a third meshnet device) that is disconnected from the first LAN may calculate first range information indicating a first range of subnet IP addresses associated with the first LAN. Similarly, the second meshnet device may transmit to all meshnet devices second LAN information associated with a second LAN to which the second meshnet device is connected. Based at least in part on receiving the second LAN information, a meshnet device (e.g., the first meshnet device and/or the third meshnet device) that is disconnected from the second LAN may calculate second range information indicating a second range of subnet IP addresses associated with the second LAN. In some aspects, a meshnet device (e.g., third meshnet device) may compare the first range information with the second range information to determine that the first range of subnet IP addresses overlaps with the second range of subnet IP addresses such that one or more first subnet IP addresses included in the first range is the same as one or more second subnet IP addresses included in the second range. In this case, the meshnet device may determine a conflict between the one or more first subnet IP addresses and the one or more second subnet IP addresses. The meshnet device may perform conflict resolution to enable access to a local network device by resolving the conflict. For instance, the meshnet device may determine an alternate range of alternate subnet IP addresses from among a pool of subnet IP addresses reserved for use by a LAN. The meshnet device may map one or more alternate subnet IP addresses with one or more first subnet IP addresses. When the meshnet device is to communicate with a first LAN device, the meshnet device may utilize a first alternate subnet IP address that is mapped to a first subnet IP address assigned to the first LAN device. Further, the meshnet device may transmit the communication to the first meshnet device because the first meshnet device is also internal to the first LAN. In another example, the meshnet device may map one or more alternate subnet IP addresses with one or more second subnet IP addresses. When the meshnet device is to communicate with a second LAN device, the meshnet device may utilize an alternate subnet IP address that is mapped to a second subnet IP address assigned to the second LAN device. Further, the meshnet device may transmit the communication to the second meshnet device because the second meshnet device is also internal to the second LAN.

In this way, by determining and mapping the alternate subnet IP addresses with subnet IP addresses associated with a LAN and by utilizing the mapped alternate subnet IP addresses to communicate with a LAN device connected to the LAN, the meshnet device may avoid inadvertent transmission and retransmission of packets. As a result, efficient utilization of meshnet device resources (e.g., processing resources, memory resources, power consumption resources, battery life, or the like) and mesh network resources and/or LAN resources (computational resources, network bandwidth, management resources, processing resources, memory resources, or the like) for performing suitable tasks associated with the mesh network and the LAN is enabled. Also, a delay in performing the suitable tasks is avoided.

In some aspects, a processor (e.g., processing unit 116, processor 820) associated with an external meshnet device may receive first connection information associated with a first local area network (LAN) from the first meshnet device, and second connection information associated with a second LAN from the second meshnet device; calculate a first range of first subnet internet protocol (IP) addresses associated with the first LAN based at least in part on utilizing the first connection information, and a second range of second subnet IP addresses associated with the second LAN based at least in part on utilizing the second connection information; determine, based at least in part on comparing the first range and the second range, a conflict that a first subnet IP address assigned to a first LAN device in the first LAN is the same as a second subnet IP address assigned to a second LAN device in the second LAN; map, based at least in part on determining the conflict, an alternate IP address to correspond with the first subnet IP address; and communicate with the first LAN device based at least in part on utilizing the alternate IP address instead of utilizing the first subnet IP address.

As indicated above, FIG. 2 is provided as an example. Other examples may differ from what is described with regard to FIG. 2.

FIG. 3 is an illustration of an example flow 300 associated with conflict resolution to enable access to local network devices via mesh network devices, according to various aspects of the present disclosure. The example flow 300 may include a plurality of meshnet devices (e.g., first meshnet device, second meshnet device, third meshnet device, etc.) in communication with an MSP control infrastructure. The plurality of meshnet devices may be similar to a user device (e.g., user device 102) discussed above with respect to FIGS. 1 and 2. In some aspects, the plurality of meshnet devices may be associated with a single account registered with the MSP control infrastructure 104. In some aspects, the plurality of meshnet devices may be associated with different accounts registered with the MSP control infrastructure 104. In some aspects, mixed variants are permissible, wherein some meshnet devices may utilize the same registered account while others may be connected to separate accounts. In some aspects, the plurality of meshnet devices may be located locally (e.g., in the same room, in the same building, etc.). In some aspects, the plurality of meshnet devices may be located remotely (e.g., in different buildings, in different cities, in different states, in different countries, etc.) with respect to another meshnet device.

The plurality of meshnet devices may install respective client applications configured and provided by the MSP control infrastructure 104. In an example, the first meshnet device may install a first client application (e.g., client application 104), the second meshnet device may install a second client application (e.g., client application 104), and the third meshnet device may install a third client application (e.g., client application 104). The plurality of meshnet devices may use the respective client applications to communicate with an application programming interface (API) and/or a processor (e.g., processing unit 110, processor 820) associated with the MSP control infrastructure 104. In some aspects, the plurality of meshnet devices and the MSP control infrastructure 104 may communicate with each other over a network (e.g., network 118). As discussed elsewhere herein, the MSP control infrastructure 104 and/or the client applications may enable the plurality of meshnet devices to obtain the mesh network services and/or to access local network devices via a mesh network.

In some aspects, the client applications may be configured and provided by the MSP control infrastructure. The client applications may enable associated meshnet devices to receive information to be processed by the client applications and/or by the MSP control infrastructure 104. Each of the client applications may include respective graphical user interfaces and/or command line interfaces (CLIs) to receive the information via local input interfaces (e.g., touch screen, keyboard, mouse, pointer, etc.) associated with the meshnet devices. The information may be received via text input or via a selection from among a plurality of options (e.g., pull down menu, etc.). In some aspects, the client applications may activate and/or enable, at a time associated with the registration (e.g., after the registration), the graphical interface for receiving the information. In an example, a client application (e.g., first client application, second client application, third client application, etc.) may cause a screen (e.g., local screen) associated with an associated meshnet device ((e.g., first meshnet device, second meshnet device, third meshnet device, etc.) to display, for example, a pop-up message to request entry of the information. Further, the client applications may enable transmission of at least a portion of the information to the MSP control infrastructure 104. In some aspects, the client applications may utilize processing units (e.g., processing unit 116, processor 820) related to the associated meshnet devices to perform processes/operations associated with obtaining the mesh network services and/or associated with conflict resolution to enable access to local network devices via mesh network devices.

Although only three meshnet devices are shown in FIG. 3, the present disclosure contemplates the mesh network to include any number of meshnet devices that perform the processes discussed herein in a similar and/or analogous manner. For instance, the mesh network may include a fourth meshnet device that performs the processes discussed herein in a similar and/or analogous manner. Further, meshnet devices may leave or join the mesh network in an ad-hoc manner.

As shown by reference numeral 305, the first meshnet device may register an account with the MSP control infrastructure 104. In some aspects, during the registration, the first meshnet device may provide registration information such as, for example, identity of an owner of the first meshnet device, a phone number associated with the first meshnet device, an email address associated with the first meshnet device, or the like. In some aspects, the first meshnet device may set up an access system including login information (e.g., access information) such as, for example, username, password, or the like to subsequently gain access to the registered account. In some aspects, the first meshnet device may share the login information with other meshnet devices (e.g., second/third meshnet device) associated with the first meshnet device to enable the other meshnet devices to utilize the login information to gain access to the MSP control infrastructure 104 via the registered account. In some aspects, a given meshnet device may be associated with the first meshnet device because the given meshnet device may be available to a user/owner of the first meshnet device. In some aspects, when the second/third meshnet device is not associated with the registered account associated with the first meshnet device, the second/third meshnet device may register a different account with the MSP control infrastructure 104.

In some aspects, the plurality of meshnet devices may utilize the login information to access the registered account/accounts to communicate with the MSP control infrastructure 104. As shown by reference numeral 310, based at least in part on the plurality of meshnet devices accessing the registered account/accounts to communicate with the MSP control infrastructure 104, the MSP control infrastructure 104 may transmit, and the plurality of meshnet devices may receive, MSP access information. In some aspects, the MSP access information may include UDP access information. The UDP access information may include information regarding an infrastructure UDP IP address and an infrastructure UDP port associated with the MSP control infrastructure 104. The MSP control infrastructure 104 may utilize the infrastructure UDP IP address and the infrastructure UDP port to communicate utilizing the UDP. In some aspects, the plurality of meshnet devices may utilize the infrastructure UDP IP address and the infrastructure UDP port to communicate with the MSP control infrastructure 104 regarding the mesh network. Further, the client applications may obtain from, for example, a domain name services (DNS) server, transmission control protocol (TCP) access information associated with the MSP control infrastructure 104. Such TCP access information may include information regarding an infrastructure TCP IP address and an infrastructure TCP port associated with the MSP control infrastructure 104. The MSP control infrastructure 104 may utilize the infrastructure TCP IP address and the infrastructure TCP port to communicate utilizing the TCP.

As shown by reference numeral 315, the plurality of meshnet devices may determine information based at least in part on the registration of the account/accounts with the MSP control infrastructure 104. In an example, the first client application may determine an asymmetric first assigned key pair associated with the first meshnet device. The first assigned key pair may be unique to the first meshnet device and may include a first assigned public key and a first assigned private key. In this way, the first assigned public key and the first assigned private key may be device-specific and maybe associated with the registered account. In some aspects, the first assigned public key and the first assigned private key may be associated with each other via, for example, a mathematical function. As a result, data encrypted using the first assigned public key may be decrypted by utilizing the first assigned private key.

Similarly, the second client application may determine an asymmetric second assigned key pair associated with the second meshnet device. The second assigned key pair may be unique to the second meshnet device and may include a second assigned public key and a second assigned private key. In this way, the second assigned public key and the second assigned private key may be device-specific and maybe associated with the registered account. In some aspects, the second assigned public key and the second assigned private key may be associated with each other via, for example, a mathematical function. As a result, data encrypted using the second assigned public key may be decrypted by utilizing the second assigned private key.

Similarly, the third client application may determine an asymmetric third assigned key pair associated with the third meshnet device. The third assigned key pair may be unique to the third meshnet device and may include a third assigned public key and a third assigned private key. In this way, the third assigned public key and the third assigned private key may be device-specific and maybe associated with the registered account. In some aspects, the third assigned public key and the third assigned private key may be associated with each other via, for example, a mathematical function. As a result, data encrypted using the third assigned public key may be decrypted by utilizing the third assigned private key.

As shown by reference numeral 320, the plurality of meshnet devices may transmit, and the MSP control infrastructure 104 may receive, at least a portion of the information determined by the client applications. For instance, the first meshnet device may transmit, for example, the first assigned public key to the MSP control infrastructure 104, the second meshnet device may transmit, for example, the second assigned public key to the MSP control infrastructure 104, and the third meshnet device may transmit, for example, the third assigned public key to the MSP control infrastructure 104. The MSP control infrastructure 104 may store and correlate the received information in association with the registered account and/or with the respective meshnet devices. In an example, the MSP control infrastructure 104 may store and correlate the first assigned public key in association with the registered account and the first meshnet device, may store and correlate the second assigned public key in association with the registered account and the second meshnet device, and may store and correlate the third assigned public key in association with the registered account and the third meshnet device.

Further, as shown by reference numeral 325, the MSP control infrastructure 104 may determine that the plurality of meshnet devices are to be included in the same mesh network. In some aspects, when the plurality of meshnet devices are associated with the same registered account, the MSP control infrastructure 104 may make such a determination regarding the secure mesh network based at least in part on determining that the plurality of meshnet devices are communicating with the MSP control infrastructure 104 by utilizing the login information associated with the same registered account. In some aspects, when the plurality of meshnet devices are associated with different registered accounts, the MSP control infrastructure 104 may make such a determination regarding the secure mesh network based at least in part on the first meshnet device (and/or the second meshnet device and/or the third meshnet device) providing information indicating that the plurality of meshnet devices are to be included in the same mesh network. Such information may include, for example, identification information (e.g., type of device, user name, email address, IP address, or a combination thereof) associated with the plurality of meshnet devices.

Based at least in part on determining that the plurality of meshnet devices are to be included in the same mesh network, as shown by reference numeral 330, the MSP control infrastructure 104 may determine meshnet IP addresses for each of the plurality of meshnet devices. In an example, the MSP control infrastructure 104 may determine a first meshnet IP address associated with the first meshnet device, a second meshnet IP address associated with the second meshnet device, and a third meshnet IP address associated with the third meshnet device. The client applications and/or third-party applications and/or operating systems respectively associated with the plurality of meshnet devices may utilize the respective meshnet IP addresses and/or the respective local meshnet ports to communicate data with the meshnet devices over meshnet connections in the mesh network. In an example, with respect to communication between the first meshnet device and the second meshnet device, the first meshnet device may determine a first meshnet IP packet indicating the first meshnet IP address as a source address, the first local meshnet port as a source port, the second meshnet IP address as a destination address, and the second local meshnet port as a destination port. The first meshnet device may encrypt and encapsulate the first meshnet IP packet within a payload of a transmitted UDP IP packet. The second meshnet device may receive the UDP IP packet, may decrypt the first meshnet IP packet, and may route the first meshnet IP packet to the second local meshnet port. Similarly, with respect to communication between the third meshnet device and the first meshnet device, with respect to communication between the third meshnet device and the first meshnet device, the third meshnet device may determine a third meshnet IP packet indicating the third meshnet IP address as a source address, the third local meshnet port as a source port, the first meshnet IP address as a destination address, and the first local meshnet port as a destination port. The third/third meshnet device may encrypt and encapsulate the third meshnet IP packet within a payload of a transmitted UDP IP packet. The first meshnet device may receive the UDP IP packet, may decrypt the third meshnet IP packet, and may route the third meshnet IP packet to the first local meshnet port. The MSP control infrastructure 104 may determine the meshnet IP addresses (e.g., the first meshnet IP address, the second meshnet IP address, the third meshnet IP address, etc.) from, for example, a pool of reserved IP addresses included in a subnet associated with an internal network of the ISP.

As shown by reference numeral 335, the plurality of meshnet devices may transmit, and the MSP control infrastructure 104 may receive, respective binding requests. In some aspects, the first meshnet device may transmit the first binding request to the MSP control infrastructure 104 using the UDP by utilizing the UDP access information received from the MSP control infrastructure 104 (e.g., block 310). In this case, the first meshnet device may transmit a first binding request to the MSP control infrastructure 104 to request the MSP control infrastructure 104 to determine a first public UDP IP address (e.g., communication address) and/or a first public UDP port (e.g., communication port) associated with the first meshnet device. Similarly, the second meshnet device may transmit a second binding request to the MSP control infrastructure 104 using the UDP by utilizing the UDP access information received from the MSP control infrastructure 104 (e.g., block 310). In this case, the second meshnet device may transmit the second binding request to the MSP control infrastructure 104 to request the MSP control infrastructure 104 to determine a second public UDP IP address (e.g., communication address) and/or a second public UDP port (e.g., communication port) associated with the second meshnet device. Similarly, the third meshnet device may transmit a third binding request to the MSP control infrastructure 104 using the UDP by utilizing the UDP access information received from the MSP control infrastructure 104 (e.g., block 310). In this case, the third meshnet device may transmit the third binding request to the MSP control infrastructure 104 to request the MSP control infrastructure 104 to determine a third public UDP IP address (e.g., communication address) and/or a third public UDP port (e.g., communication port) associated with the third meshnet device. In some aspects, the UDP IP addresses (e.g., first UDP IP address, second UDP IP address, third UDP IP address) and/or the UDP ports (e.g., first UDP port, second UDP port, third UDP port) are to be utilized by the plurality of meshnet devices to communicate with each other in the mesh network.

In some aspects, the first public UDP IP address and/or the first public UDP port may be determined by a first NAT device (e.g., a router) responsible for managing operation of the first meshnet device in a first local network. In an example, the first NAT device may translate a first local UDP IP address and/or a first local UDP port associated with the first meshnet device to the first public UDP IP address and/or the first public UDP port that the first meshnet device utilizes to communicate (e.g., transmit and/or receive) over the Internet using the UDP. Similarly, the second public UDP IP address and/or the second public UDP port may be determined by a second NAT device responsible for managing operation of the second meshnet device in a second local network. In an example, the second NAT device may translate a second local UDP IP address and/or a second local UDP port associated with the second meshnet device to the second public UDP IP address and/or the second public UDP port that the second meshnet device utilized to communicate (e.g., transmit and/or receive) over the Internet using the UDP. Similarly, the third public UDP IP address and/or the third public UDP port may be determined by a third NAT device responsible for managing operation of the third meshnet device in a third local network. In an example, the third NAT device may translate a third local UDP IP address and/or a third local UDP port associated with the third meshnet device to the third public UDP IP address and/or the third public UDP port that the third meshnet device utilized to communicate (e.g., transmit and/or receive) over the Internet using the UDP.

Based at least in part on receiving the respective binding requests, as shown by reference numeral 340, the MSP control infrastructure 104 may determine public UDP IP addresses and/or public UDP ports associated with the plurality of meshnet devices. In an example, based at least in part on receiving the first binding request, the MSP control infrastructure 104 may determine the first public UDP IP address and/or the first public UDP port associated with the first meshnet device. In some aspects, the MSP control infrastructure 104 may determine the first public UDP IP address and/or the first public UDP port based at least in part on analyzing the UDP communication (e.g., UDP IP packet) including the first binding request received from the first meshnet device. The UDP communication may include, for example, a header that indicates the first public UDP IP address as a source UDP IP address and/or the first public UDP port as a source UDP port associated with the first meshnet device. Further, the MSP control infrastructure 104 may store and correlate the first public UDP IP address and/or the first UDP port in association with the first meshnet device in, for example, the meshnet database 112.

Similarly, based at least in part on receiving the second binding request, the MSP control infrastructure 104 may determine the second public UDP IP address and/or the second public UDP port associated with the second meshnet device. In some aspects, the MSP control infrastructure 104 may determine the second public UDP IP address and/or the second public UDP port based at least in part on analyzing the UDP communication (e.g., UDP IP packet) including the second binding request received from the second meshnet device. The UDP communication may include, for example, a header that indicates the second public UDP IP address as a source UDP IP address and/or the second public UDP port as a source UDP port associated with the second meshnet device. Further, the MSP control infrastructure 104 may store and correlate the second public UDP IP address and/or the second public UDP port in association with the second meshnet device in, for example, the meshnet database 112.

Similarly, based at least in part on receiving the third binding request, the MSP control infrastructure 104 may determine the third public UDP IP address and/or the third public UDP port associated with the third meshnet device. In some aspects, the MSP control infrastructure 104 may determine the third public UDP IP address and/or the third public UDP port based at least in part on analyzing the UDP communication (e.g., UDP IP packet) including the third binding request received from the third meshnet device. The UDP communication may include, for example, a header that indicates the third public UDP IP address as a source UDP IP address and/or the third public UDP port as a source UDP port associated with the third meshnet device. Further, the MSP control infrastructure 104 may store and correlate the third public UDP IP address and/or the third public UDP port in association with the third meshnet device in, for example, the meshnet database 112.

Based at least in part on determining the public UDP IP addresses and/or the public UDP ports, as shown by reference numeral 345, the MSP control infrastructure 104 may transmit, and the plurality of meshnet devices may receive, communication information. In an example, the MSP control infrastructure 104 may transmit, and the first meshnet device may receive, first communication information including the first meshnet IP address associated with the first meshnet device, the second meshnet IP address associated with the second meshnet device, the third meshnet IP address associated with the third meshnet device, the second public UDP IP address and/or the second public UDP port associated with the second meshnet device, the third public UDP IP address and/or the third public UDP port associated with the third meshnet device, the second public key associated with the second meshnet device, and/or the third public key associated with the third meshnet device. Similarly, the MSP control infrastructure 104 may transmit, and the second meshnet device may receive, second communication information including the first meshnet IP address associated with the first meshnet device, the second meshnet IP address associated with the second meshnet device, the third meshnet IP address associated with the third meshnet device, the first public UDP IP address and/or the first public UDP port associated with the first meshnet device, the third public UDP IP address and/or the third public UDP port associated with the third meshnet device, the first public key associated with the first meshnet device, and/or the third public key associated with the third meshnet device. Similarly, the MSP control infrastructure 104 may transmit, and the third meshnet device may receive, third communication information including the first meshnet IP address associated with the first meshnet device, the second meshnet IP address associated with the second meshnet device, the third meshnet IP address associated with the third meshnet device, the first public UDP IP address and/or the first public UDP port associated with the first meshnet device, the second public UDP IP address and/or the second public UDP port associated with the second meshnet device, the first public key associated with the first meshnet device, and/or the second public key associated with the second meshnet device. In some aspects, the above reception of communication information may enable the plurality of meshnet devices to communicate securely and privately in the mesh network.

As shown by reference numeral 350, the plurality of meshnet devices may communicate with each other to set up meshnet connections (e.g., an encrypted tunnels) for communicating encrypted data in the secure mesh network. The communication to set up a meshnet connection between the first meshnet device and the second meshnet device is discussed below. The present disclosure contemplates similar and/or analogous communications to set up meshnet connections between the first meshnet device and the third meshnet device or between the second meshnet device and the third meshnet device.

In some aspects, the first meshnet device and the second meshnet device may communicate with each other directly to set up the meshnet connection. In this case, the first meshnet device may utilize the second assigned public key and/or the second public IP address (e.g., second UDP IP address) to securely (e.g., in encrypted form) communicate with the second meshnet device, and the second meshnet device may utilize the first assigned public key and/or the first public IP address (e.g., first UDP IP address) to securely communicate with the first meshnet device. In some aspects, the first and second meshnet devices may communicate to securely/privately negotiate parameters associated with the meshnet connection. In some aspects, the parameters may be randomly generated to provide optimized security to the communications. In an example, the first and second meshnet devices may privately negotiate a symmetric cryptographic key that is to be utilized by the first and second meshnet devices specifically for encrypting and decrypting data communicated via the meshnet connection. The symmetric cryptographic key may be determined based at least in part on any combination of the first public key, the second public key, and/or randomly generated numbers. Additionally, the first and second meshnet devices may negotiate to utilize a secure protocol (e.g., Wireguard, IKEv2, etc.) to communicate the data via the meshnet connection.

Alternatively, the first and second meshnet devices may communicate with each other indirectly via, for example, a relay device (e.g., a relay server) to set up the meshnet connection. In an example, the first meshnet device may provide the first assigned public key to a relay server, which may store an association of the first assigned public key with the first meshnet device. In some aspects, the association may include an association between the first assigned public key and a first communication connection between the relay server and the first meshnet device. Similarly, the second meshnet device may provide the second assigned public key to the relay server, which may store an association of the second assigned public key with the second meshnet device. In some aspects, the association may include an association between the second assigned public key and a second communication connection between the relay server and the second meshnet device. The relay server may rely on the stored associations of public keys and client applications to determine a destination of a received message. In some aspects, the relay server may include a network of relay servers that enable the meshnet devices to communicate with each other. In this case, the meshnet devices may provide the respective assigned public keys to different relay servers included within the network of relay servers or the relay servers may share associations related to the respective assigned public keys with each other.

In some aspects, the meshnet device application may transmit, to the relay server, a first message that is to be delivered to the second meshnet device. Along with the first message, the first meshnet device may transmit the second assigned public key. Further, the first meshnet device may encrypt the first message utilizing the second assigned public key. In some aspects, the first meshnet device may encrypt the first message based at least in part on utilizing the negotiated cryptographic key. Based at least in part on receiving the encrypted first message and the second assigned public key, the relay server may determine from stored associations that the second assigned public key is associated with the second meshnet device. As a result, the relay server may determine that the first message is to be relayed (e.g., transmitted) to the second meshnet device. Similarly, the second meshnet device may transmit, to the relay server, a second message that is to be delivered to the first meshnet device. Along with the second message, the second meshnet device may transmit the first assigned public key. Further, the second meshnet device may encrypt the second message utilizing the first assigned public key. In some aspects, the second meshnet device may encrypt the second message based at least in part on utilizing the negotiated cryptographic key. Based at least in part on receiving the encrypted second message and the first assigned public key, the relay server may determine from stored associations that the first assigned public key is associated with the first meshnet device. As a result, the relay server may determine that the second message is to be relayed (e.g., transmitted) to the first meshnet device. In this way, the relay server may enable the client applications to communicate with each other to set up the meshnet connection.

Based at least in part on establishing (e.g., setting up) the meshnet connection, the first and second meshnet devices may begin communicating encrypted data via the meshnet connection based at least in part on utilizing the negotiated parameters and the secure protocol.

As discussed previously, in a similar and/or analogous manner, the first and third meshnet devices may set up a meshnet connection therebetween. Also, in a similar and/or analogous manner, the second and third meshnet devices may set up a meshnet connection therebetween. Additional meshnet devices that enter the mesh network may also set up meshnet connections with the other meshnet devices included in the mesh network in a similar and/or analogous manner.

As shown by reference numeral 355, the plurality of meshnet devices may perform conflict resolution to enable access to a LAN device. In some aspects, a meshnet device connected to a LAN may perform conflict resolution to enable access to a LAN device via the meshnet device. In an example, performing conflict resolution to enable access to a local network device may include enabling a meshnet device, external to (e.g., disconnected from) a local network, to communicate with a local network device that is internal to (e.g., connected to) the local network, via another meshnet device that is also internal to the local network. In an example, the third meshnet device, external to the first LAN and external to the second LAN, may be enabled to communicate with one or more first LAN devices via the first meshnet device that is internal to the first LAN and/or may be enabled to communicate with one or more second LAN devices via the second meshnet device that is internal to the second LAN. In another example, the first meshnet device, external to the second LAN, may be enabled to communicate with one or more second LAN devices via the second meshnet device that is internal to the second LAN. In yet another example, the second meshnet device, external to the first LAN, may be enabled to communicate with one or more first LAN devices via the first meshnet device that is internal to the first LAN.

In some aspects, the first LAN may be associated with a first range of first subnet IP addresses, with each device connected to the first LAN (e.g., first meshnet device, first LAN device, etc.) being assigned a respective first subnet IP address. In some aspects, the first meshnet device may either be aware of the first range of subnet IP addresses and/or may calculate the first range of subnet IP addresses. Similarly, the second LAN may be associated with a second range of second subnet IP addresses, with each device connected to the second LAN (e.g., second meshnet device, second LAN device, etc.) being assigned a respective second subnet IP address. In some aspects, the second meshnet device may either be aware of the second range of subnet IP addresses and/or may calculate the second range of subnet IP addresses.

To enable access to a local network device, based at least in part on establishing the meshnet connections, the plurality of meshnet devices may share LAN information with each other. In an example, because the second meshnet device is internal to the second LAN, the second meshnet device may share second LAN information associated with the second LAN. The second LAN information may indicate, for example, a second subnet mask associated with the second LAN, a subnet IP address assigned to the second meshnet device by the second LAN, and/or a second domain name service (DNS) public IP address assigned to a DNS server associated with the second LAN.

Based at least in part on utilizing the second subnet mask and the subnet IP address assigned to the second meshnet device, an external meshnet device (e.g., the first meshnet device and/or the third meshnet device) that is external to the second LAN may calculate the second range of subnet IP addresses associated with the second LAN. In some aspects, the second range of subnet IP addresses may indicate a second starting subnet IP address and a second ending subnet IP address. Based at least in part on calculating the second range of subnet IP addresses, the external meshnet device may determine that subnet IP addresses assigned to the second LAN devices (e.g., the second meshnet device, the one or more second LAN devices, etc.) fall within the second range including the second starting subnet IP address and the second ending subnet IP address.

Based at least in part on calculating the second range of subnet IP addresses, the first meshnet device that is also connected to the first LAN, may compare the first range of subnet IP addresses associated with the first LAN with the second range of subnet IP addresses associated with the second LAN. In some aspects, the first meshnet device may perform the comparison prior to sharing first LAN information that indicates, for example, a first subnet mask associated with the first LAN, a subnet IP address assigned to the first meshnet device by the first LAN, and/or a first domain name service (DNS) public IP address assigned to a DNS server associated with the first LAN. Based at least in part on the comparison, the first meshnet device may determine that the first range of subnet IP addresses overlaps, at least partially, with the second range of subnet IP addresses. In other words, the first meshnet device may determine that one or more first subnet IP addresses is the same as one or more second subnet IP addresses. In an example, the first meshnet device may determine that a first subnet IP address assigned to a first LAN device is the same as a second subnet IP address assigned to a second LAN device. In this case, the first meshnet device may determine a conflict between the one or more first subnet IP addresses and the one or more second subnet IP addresses.

Based at least in part on determining the conflict, the first meshnet device may resolve the conflict by determining an alternate range of subnet IP addresses for the first LAN. In some aspects, the first meshnet device may determine the alternate range of subnet IP addresses by selecting, from among a pool of subnet IP addresses reserved for use by a LAN, a number of alternate IP addresses equivalent to a number of first subnet IP addresses included in the first range. Further, the first meshnet device may map the alternate IP addresses with the first subnet IP addresses such that each first subnet IP address corresponds to a given alternate IP address. The first meshnet device may store the mapping in a memory (e.g., memory 830) associated with the first meshnet device.

Based at least in part on determining the mapping, the first meshnet device may transmit a conflict resolution message to one or more external meshnet devices (e.g., second meshnet device, third meshnet device, etc.) included in the mesh network to indicate the determined conflict between the one or more first subnet IP addresses and the one or more second subnet IP addresses. The conflict resolution message may include the determined map of each first subnet IP address corresponding to a given alternate IP address.

Additionally, or alternatively, the first meshnet device may transmit an alternate IP address associated with a LAN device internal to the first LAN (e.g., alternate IP address mapped to the subnet IP address assigned to the first meshnet device by the first LAN) and an alternate subnet mask associated with the alternate IP addresses to the one or more external meshnet devices. The one or more external meshnet devices may calculate an alternate range of alternate IP addresses. Further, the one or more external meshnet devices may map the alternate IP addresses included in the alternate range with corresponding first subnet IP addresses based at least in part on matching a portion (e.g., host part) of an alternate IP address with a corresponding portion (e.g., host part) of a first subnet IP address. In an example, the one or more external meshnet devices may map a first alternate IP address with a first subnet IP address based at least in part on a portion of the first alternate IP address matching a corresponding portion of the first subnet IP address, a second alternate IP address with a second subnet IP address based at least in part on a portion of the second alternate IP address matching a corresponding portion of the second subnet IP address, and so on.

When the external meshnet device is to communicate with a first LAN device, the external meshnet device may determine a current subnet IP address currently assigned to the first LAN device. In one example, to determine the current subnet IP address, the external meshnet device may transmit a query to the DNS server associated with the first LAN. The query may include identification information to identify the first LAN device and may request the DNS server to return the current subnet IP address assigned to the first LAN device. The identification information may include, for example, a name associated with the first LAN device, a function associated with the first LAN device, a make and/or model of the first LAN device, a public IP address and/or public port associated with the first LAN device, or a combination thereof.

For instance, the external meshnet device may utilize the first DNS IP address to transmit the query to the first DNS server associated with the first LAN. Based at least in part on transmitting the query, the external meshnet device may receive, from the first DNS server the first subnet IP address currently assigned to the first LAN device. When the first subnet IP address is received from the first DNS server, the external meshnet device may determine that the identified LAN device is the first LAN device internal to the first LAN.

In some aspects, the external meshnet device may configure third-party applications (e.g., web browser, client application, etc.) that are used to communicate with one or more first LAN devices to utilize alternate IP addresses instead of utilizing the first subnet IP addresses. In an example, the external meshnet device may use a third-party application to communicate with a first LAN device. In this case, the external meshnet device may configure the third-party application to utilize the first alternate IP address that corresponds to the first subnet IP address assigned to the first LAN device by the first LAN. As a result, when the external meshnet device is to communicate with the first LAN device, the third-party application may determine a network packet (discussed below in further detail) indicating the first alternate IP as the destination address. Alternatively, in some aspects, the external meshnet device may configure an operating system associated with the external meshnet device to enable its client application to modify the network packet transmitted by the third-party application to indicate the first alternate IP as the destination address prior to transmitting the network packet for receipt by the first LAN device.

When the external meshnet device is to communicate with the first LAN device, the external meshnet device may select a meshnet device internal to the first LAN to communicate with the first LAN device. In some aspects, the external meshnet device may select the first meshnet device from among meshnet devices known to be internal to LANs. In this case, the external meshnet device may determine an initiation meshnet packet to be transmitted to the first meshnet device over the meshnet connection between the external meshnet device and the first meshnet device. The initiation meshnet packet may be encrypted based at least in part on utilizing the cryptographic key (e.g., block 350) negotiated between the external meshnet device and the first meshnet device.

In some aspects, an initiation meshnet header included in the initiation meshnet packet may indicate an external meshnet IP address (associated with the external meshnet device) as a source address to indicate that the initiation meshnet packet is transmitted by the external meshnet device. Further, the initiation meshnet header may indicate the first meshnet IP address as a destination address to indicate that the initiation meshnet packet is to be received by the first meshnet device.

In an initiation meshnet payload included in the initiation meshnet packet, the external (e.g., the third meshnet device) meshnet device may include an initiation network packet to be transmitted to the first LAN device. The initiation network packet may include an initiation network header indicating the external meshnet IP address as the source address to indicate that the initiation network packet is transmitted by the external meshnet device. Further, the initiation network header may indicate the first alternate IP address (corresponding to the first subnet IP address assigned to the first LAN device) as the destination address to indicate that the initiation network packet is to be received by the first LAN device. The initiation network packet may also include an initiation network payload with information to be received by the first LAN device.

Based at least in part on receiving the encrypted initiation meshnet packet over the meshnet connection, the first meshnet device may utilize the negotiated cryptographic key to decrypt the encrypted initiation meshnet packet. The first meshnet device may determine, based at least in part on analyzing the initiation meshnet header, that the initiation meshnet packet is transmitted by the external meshnet device and is to be received by the first meshnet device. Further, based at least in part on analyzing the initiation meshnet payload, the first meshnet device may determine the initiation network header included in the initiation network packet.

Based at least in part on having previously received the mapping and/or on analyzing the initiation network header, the first meshnet device may determine that the initiation network header indicates the first alternate IP address as the destination address. In this case, the first meshnet device may reference the mapping received from the external meshnet device and determine that the first alternate IP address corresponds to the first subnet IP address assigned to the first LAN device. As a result, the first meshnet device may determine that first meshnet device is to transmit the initiation network packet to the first LAN device.

The first meshnet device may determine a modified initiation network packet by modifying the initiation network header in the initiation network packet to indicate the subnet IP address assigned to the first meshnet device as the source address. Also, the first meshnet device may modify the initiation network header to indicate the first subnet IP address that corresponds to the first alternate IP address and/or is assigned to the first LAN device as the destination address. Further, the first meshnet device may transmit the modified initiation network packet to the first LAN device.

Based at least in part on transmitting the modified initiation network packet, the first meshnet device may receive a response network packet from the first LAN device. In some aspects, the response network packet may be received within a given duration of time (e.g., 60 seconds, 120 seconds, 300 seconds, etc.) after transmitting the modified initiation network packet.

The response network packet may include a response network header indicating the first subnet IP address assigned to the first LAN device as the source address and indicating the subnet IP address assigned by the first LAN to the first meshnet device as the destination address. Further, the response network packet may include a response network payload along with information indicating that the response network payload is to be transmitted to the external meshnet device. In some aspects, the first meshnet device may determine that the response network payload is to be provided to the external meshnet device based at least in part on receiving the response network packet within the given duration of time.

In this case, the first meshnet device may determine a response meshnet packet including a response meshnet header indicating the first meshnet IP address of the first meshnet device as the source address and indicating the external meshnet IP address of the external meshnet device as the destination address. The response meshnet packet may include a response meshnet payload including the response network payload received from the first LAN device. The first meshnet device may transmit the response meshnet packet to the external meshnet device over the meshnet connection between the first meshnet device and the external meshnet device. The response meshnet packet may be encrypted based at least in part on utilizing the cryptographic key (e.g., block 350) negotiated between the external meshnet device and the first meshnet device.

Based at least in part on receiving the encrypted response meshnet packet over the meshnet connection, the external meshnet device may utilize the negotiated cryptographic key to decrypt the encrypted response meshnet packet. The external meshnet device may determine, based at least in part on analyzing the response meshnet header, that the response meshnet packet is transmitted by the first meshnet device and is to be received by the external meshnet device. Further, based at least in part on analyzing the response meshnet payload, the external meshnet device may determine the response network payload transmitted by the first LAN device via the first meshnet device. In this way, the first meshnet device may enable the external meshnet device, that is external to the first LAN, to access (e.g., communicate with) the first LAN device that is internal to the first LAN.

In a similar and/or analogous manner as discussed above with respect to the first meshnet device enabling the external meshnet device (e.g., the second meshnet device and/or the third meshnet device) to access a first LAN device via the first meshnet device, the present disclosure contemplates the second meshnet device enabling an external meshnet device (e.g., the first meshnet device and/or the third meshnet device) to access (e.g., communicate with) a second LAN device via the second meshnet device. In this case, the second meshnet device may perform the actions discussed above with respect to the first meshnet device.

In this way, even when disconnected from the LAN, the external meshnet device may utilize another meshnet device connected to the LAN to access an intended LAN device (e.g., communicate with a LAN device) while avoiding inadvertent transmissions and/or retransmissions. As a result, by utilizing existing meshnet connections to enable access to the LAN device, efficient utilization of user device resources (e.g., processing resources, memory resources, power consumption resources, battery life, or the like) and network resources (computational resources, network bandwidth, management resources, processing resources, memory resources, or the like) for performing suitable tasks associated with the mesh network and the LAN is enabled. Also, a delay in with the intended LAN device is avoided.

As indicated above, FIG. 3 is provided as an example. Other examples may differ from what is described with regard to FIG. 3.

FIG. 4 is an illustration of an example process 400 associated with conflict resolution to enable access to local network devices via mesh network devices, according to various aspects of the present disclosure. In some aspects, the process 400 may be performed by a memory and/or a processor/controller (e.g., processing unit 116, processor 820) associated with a first meshnet device (e.g., user device 102) running a client application. In some aspects, process 400 may be in a mesh network including the first meshnet device in communication with a second meshnet device, the first meshnet device being connected to a first local area network (LAN) and the second meshnet device being connected to a second LAN. As shown by reference numeral 410, process 400 may include determining, by the first meshnet device, a first range of first subnet internet protocol (IP) addresses associated with the first LAN, and a second range of second subnet IP addresses associated with the second LAN. For instance, the first meshnet device may utilize the associated memory and/or processor to determine a first range of first subnet internet protocol (IP) addresses associated with the first LAN, and a second range of second subnet IP addresses associated with the second LAN, as discussed elsewhere herein.

As shown by reference numeral 420, process 400 may include determining, by the first meshnet device based at least in part on comparing the first range with the second range, a conflict that a first subnet IP address assigned to a first LAN device in the first LAN matches a second subnet IP address assigned to a second LAN device in the second LAN. For instance, the first meshnet device may utilize the associated memory and/or processor to determine, based at least in part on comparing the first range with the second range, a conflict that a first subnet IP address assigned to a first LAN device in the first LAN matches a second subnet IP address assigned to a second LAN device in the second LAN, as discussed elsewhere herein.

As shown by reference numeral 430, process 400 may include mapping, by the first meshnet device based at least in part on determining the conflict, an association between an alternate IP address and the first subnet IP address. For instance, the first meshnet device may utilize the associated memory and/or processor to map, based at least in part on determining the conflict, an association between an alternate IP address and the first subnet IP address, as discussed elsewhere herein.

As shown by reference numeral 440, process 400 may include transmitting, by the first meshnet device to the second meshnet device, the association between the alternate IP address and the first subnet IP address. For instance, the first meshnet device may utilize an associated communication interface (e.g., communication interface 870) with the associated memory and/or processor to transmit, to the second meshnet device, the association between the alternate IP address and the first subnet IP address, as discussed elsewhere herein.

As shown by reference numeral 450, process 400 may include receiving, by the first meshnet device from the second meshnet device, an initiation network packet to be transmitted by the first meshnet device to the first LAN device, the initiation network packet indicating the alternate IP address as a destination address. For instance, the first meshnet device may utilize the communication interface along with the associated memory and/or processor to receive, from the second meshnet device, an initiation network packet to be transmitted by the first meshnet device to the first LAN device, the initiation network packet indicating the alternate IP address as a destination address, as discussed elsewhere herein.

Process 400 may include additional aspects, such as any single aspect or any combination of aspects described below and/or in connection with one or more other processes described elsewhere herein.

In a first aspect, process 400 may include receiving, by the first meshnet device from the second meshnet device, first connection information indicating a second subnet IP address and a second subnet IP mask associated with the second LAN to enable the first meshnet device to determine the second range.

In a second aspect, alone or in combination with the first aspect, process 400 may include determining, by the first meshnet device, the alternate IP address from a pool of subnet IP addresses reserved for use by local area networks.

In a third aspect, alone or in combination with the first through second aspects, process 400 may include transmitting, by the first meshnet device, the initiation network packet to the first LAN device based at least in part on the association between the alternate IP address and the first subnet IP address.

In a fourth aspect, alone or in combination with the first through third aspects, process 400 may include transmitting, by the first meshnet device, the initiation network packet to the first LAN device over a first LAN connection between the first meshnet device and the first LAN device.

In a fifth aspect, alone or in combination with the first through fourth aspects, process 400 may include receiving, by the first meshnet device from the first LAN device, a response network packet to be transmitted to the second meshnet device.

In a sixth aspect, alone or in combination with the first through fifth aspects, process 400 may include receiving the initiation network packet in a communication that is encrypted with a cryptographic key associated with a meshnet connection between the first meshnet device and the second meshnet device.

Although FIG. 4 shows example blocks of the process, in some aspects, the process may include additional blocks, fewer blocks, different blocks, or differently arranged blocks than those depicted in FIG. 4. Additionally, or alternatively, two or more of the blocks of the process may be performed in parallel.

As indicated above, FIG. 4 is provided as an example. Other examples may differ from what is described with regard to FIG. 4.

FIG. 5 is an illustration of an example process 500 associated with conflict resolution to enable access to local network devices via mesh network devices, according to various aspects of the present disclosure. In some aspects, the process 500 may be performed by a memory and/or a processor/controller (e.g., processing unit 116, processor 820) associated with a user device/meshnet device (e.g., user device 102) running a client application. In some aspects, the process may be performed in a mesh network including a first meshnet device in communication with a second meshnet device and a third meshnet device in a mesh network, the first meshnet device being connected to a first local area network (LAN) and the second meshnet device being connected to a second LAN. As shown by reference numeral 510, process 500 may include determining, by the first meshnet device, that a first subnet internet protocol (IP)

address assigned to a first LAN device connected to the first LAN matches a second subnet IP address assigned to a second LAN device connected to the second LAN. For instance, the first meshnet device may utilize the associated memory and/or processor to determine that a first subnet internet protocol (IP) address assigned to a first LAN device connected to the first LAN matches a second subnet IP address assigned to a second LAN device connected to the second LAN, as discussed elsewhere herein.

As shown by reference numeral 520, process 500 may mapping, by the first meshnet device, an association between an alternate IP address and the first subnet IP address based at least in part on determining that the first subnet IP address matches the second subnet IP address. For instance, the first meshnet device may utilize the associated memory and/or processor to map an association between an alternate IP address and the first subnet IP address based at least in part on determining that the first subnet IP address matches the second subnet IP address, as discussed elsewhere herein.

As shown by reference numeral 530, process 500 may include transmitting, by the first meshnet device to the third meshnet device, the association between the alternate IP address and the first subnet IP address. For instance, the first meshnet device may utilize an associated communication interface (e.g., communication interface 870) along with the associated memory and/or processor to transmit, to the third meshnet device, the association between the alternate IP address and the first subnet IP address, as discussed elsewhere herein.

As shown by reference numeral 540, process 500 may include receiving, by the first meshnet device from the third meshnet device, an initiation network packet to be transmitted by the first meshnet device to the first LAN device, the initiation network packet indicating the alternate IP address as a destination address. For instance, the first meshnet device may utilize the associated communication interface, memory, and/or processor to receive, from the third meshnet device, an initiation network packet to be transmitted by the first meshnet device to the first LAN device, the initiation network packet indicating the alternate IP address as a destination address, as discussed elsewhere herein.

As shown by reference numeral 550, process 500 may include transmitting, by the first meshnet device, the initiation network packet to the first LAN device over a first LAN connection between the first meshnet device and the first LAN device. For instance, the first meshnet device may utilize the associated communication interface, memory, and/or processor to transmit the initiation network packet to the first LAN device over a first LAN connection between the first meshnet device and the first LAN device, as discussed elsewhere herein.

Process 500 may include additional aspects, such as any single aspect or any combination of aspects described below and/or in connection with one or more other processes described elsewhere herein.

In a first aspect, process 500 may include calculating, by the first meshnet device, a first range of subnet IP addresses associated with the first LAN, and a second range of subnet IP addresses associated with the second LAN.

In a second aspect, alone or in combination with the first aspect, process 500 may include comparing, by the first meshnet device, a first range of subnet IP addresses associated with the first LAN with a second range of subnet IP addresses associated with the second LAN.

In a third aspect, alone or in combination with the first through second aspects, process 500 may include determining, by the first meshnet device, that a first range of subnet IP addresses associated with the first LAN overlaps a second range of subnet IP addresses associated with the second LAN.

In a fourth aspect, alone or in combination with the first through third aspects, process 500 may include determining, by the first meshnet device, the alternate IP address from among a pool of subnet IP addresses reserved for use by local area networks.

In a fifth aspect, alone or in combination with the first through fourth aspects, process 500 may include receiving, by the first meshnet device from the first LAN device, a response network packet to be transmitted to the third meshnet device.

In a sixth aspect, alone or in combination with the first through fifth aspects, process 500 may include receiving, by the first meshnet device, the initiation network packet in a communication that is encrypted with a cryptographic key associated with a meshnet connection between the first meshnet device and the third meshnet device.

Although FIG. 5 shows example blocks of the process, in some aspects, the process may include additional blocks, fewer blocks, different blocks, or differently arranged blocks than those depicted in FIG. 5. Additionally, or alternatively, two or more of the blocks of the process may be performed in parallel.

As indicated above, FIG. 5 is provided as an example. Other examples may differ from what is described with regard to FIG. 5.

FIG. 6 is an illustration of an example process 600 associated with conflict resolution to enable access to local network devices via mesh network devices, according to various aspects of the present disclosure. In some aspects, the process 600 may be performed by a memory and/or a processor/controller (e.g., processing unit 110, processor 820) associated with an infrastructure device (e.g., MSP control infrastructure 104) capable of configuring client applications installed on user/meshnet devices. In some aspects, process 600 may be performed by the infrastructure device associated with a first meshnet device in communication with a second meshnet device in a mesh network, the first meshnet device being connected to a first local area network (LAN) and the second meshnet device being connected to a second LAN. As shown by reference numeral 610, process 600 may include configuring the first meshnet device to determine a first range of first subnet internet protocol (IP) addresses associated with the first LAN, and a second range of second subnet IP addresses associated with the second LAN. For instance, the infrastructure device may utilize the associated memory and/or processor to configure the first meshnet device to determine a first range of first subnet internet protocol (IP) addresses associated with the first LAN, and a second range of second subnet IP addresses associated with the second LAN, as discussed elsewhere herein.

As shown by reference numeral 620, process 600 may include configuring the first meshnet device to determine, based at least in part on comparing the first range with the second range, a conflict that a first subnet IP address assigned to a first LAN device in the first LAN matches a second subnet IP address assigned to a second LAN device in the second LAN. For instance, the infrastructure device may utilize the associated memory and/or processor to configure the first meshnet device to determine, based at least in part on comparing the first range with the second range, a conflict that a first subnet IP address assigned to a first LAN device in the first LAN matches a second subnet IP address assigned to a second LAN device in the second LAN, as discussed elsewhere herein.

As shown by reference numeral 630, process 600 may include configuring the first meshnet device to map, based at least in part on determining the conflict, an association between an alternate IP address and the first subnet IP address. For instance, the infrastructure device may utilize the associated memory and/or processor to configure the first meshnet device to map, based at least in part on determining the conflict, an association between an alternate IP address and the first subnet IP address, as discussed elsewhere herein.

As shown by reference numeral 640, process 600 may include configuring the first meshnet device to transmit, to the second meshnet device, the association between the alternate IP address and the first subnet IP address. For instance, the infrastructure device may utilize the associated memory and/or processor to configure the first meshnet device to transmit, to the second meshnet device, the association between the alternate IP address and the first subnet IP address, as discussed elsewhere herein.

As shown by reference numeral 650, process 600 may include configuring the first meshnet device to receive, from the second meshnet device, an initiation network packet to be transmitted by the first meshnet device to the first LAN device, the initiation network packet indicating the alternate IP address as a destination address. For instance, the infrastructure device may utilize the associated memory and/or processor to configure the first meshnet device to receive, from the second meshnet device, an initiation network packet to be transmitted by the first meshnet device to the first LAN device, the initiation network packet indicating the alternate IP address as a destination address, as discussed elsewhere herein.

Process 600 may include additional aspects, such as any single aspect or any combination of aspects described below and/or in connection with one or more other processes described elsewhere herein.

In a first aspect, process 600 may include configuring the first meshnet device to receive, from the second meshnet device, first connection information indicating a second subnet IP address and a second subnet IP mask associated with the second LAN to enable the first meshnet device to determine the second range.

In a second aspect, alone or in combination with the first aspect, process 600 may include configuring the first meshnet device to determine the alternate IP address from a pool of subnet IP addresses reserved for use by local area networks.

In a third aspect, alone or in combination with the first through second aspects, process 600 may include configuring the first meshnet device to transmit the initiation network packet to the first LAN device based at least in part on the association between the alternate IP address and the first subnet IP address.

In a fourth aspect, alone or in combination with the first through third aspects, process 600 may include configuring the first meshnet device to transmit the initiation network packet to the first LAN device over a first LAN connection between the first meshnet device and the first LAN device.

In a fifth aspect, alone or in combination with the first through fourth aspects, process 600 may include configuring the first meshnet device to receive, from the first LAN device, a response network packet to be transmitted to the second meshnet device.

In a sixth aspect, alone or in combination with the first through fifth aspects, process 600 may include configuring the first meshnet device to receive the initiation network packet in a communication that is encrypted with a cryptographic key associated with a meshnet connection between the first meshnet device and the second meshnet device.

Although FIG. 6 shows example blocks of the process, in some aspects, the process may include additional blocks, fewer blocks, different blocks, or differently arranged blocks than those depicted in FIG. 6. Additionally, or alternatively, two or more of the blocks of the process may be performed in parallel.

As indicated above, FIG. 6 is provided as an example. Other examples may differ from what is described with regard to FIG. 6.

FIG. 7 is an illustration of an example process 700 associated with conflict resolution to enable access to local network devices via mesh network devices, according to various aspects of the present disclosure. In some aspects, the process 700 may be performed by a memory and/or a processor/controller (e.g., processing unit 110, processor 720) associated with an infrastructure device (e.g., MSP control infrastructure 104) capable of configuring client applications installed on user/meshnet devices. In some aspects, process 700 may be performed by the infrastructure device in a mesh network including a first meshnet device in communication with a second meshnet device and a third meshnet device in a mesh network, the first meshnet device being connected to a first local area network (LAN) and the second meshnet device being connected to a second LAN.

As shown by reference numeral 710, process 700 may include configuring the first meshnet device to determine that a first subnet internet protocol (IP) address assigned to a first LAN device connected to the first LAN matches a second subnet IP address assigned to a second LAN device connected to the second LAN. For instance, the infrastructure device may utilize the associated memory and/or processor to configure the first meshnet device to determine that a first subnet internet protocol (IP) address assigned to a first LAN device connected to the first LAN matches a second subnet IP address assigned to a second LAN device connected to the second LAN, as discussed elsewhere herein.

As shown by reference numeral 720, process 700 may include configuring the first meshnet device to map an association between an alternate IP address and the first subnet IP address based at least in part on determining that the first subnet IP address matches the second subnet IP address. For instance, the infrastructure device may utilize the associated memory and/or processor to configure the first meshnet device to map an association between an alternate IP address and the first subnet IP address based at least in part on determining that the first subnet IP address matches the second subnet IP address, as discussed elsewhere herein.

As shown by reference numeral 730, process 700 may include configuring the first meshnet device to transmit, to the third meshnet device, the association between the alternate IP address and the first subnet IP address. For instance, the infrastructure device may utilize the associated memory and/or processor to configure the first meshnet device to transmit, to the third meshnet device, the association between the alternate IP address and the first subnet IP address, as discussed elsewhere herein.

As shown by reference numeral 740, process 700 may include configuring the first meshnet device to receive, from the third meshnet device, an initiation network packet to be transmitted by the first meshnet device to the first LAN device, the initiation network packet indicating the alternate IP address as a destination address. For instance, the infrastructure device may utilize the associated memory and/or processor to configure the first meshnet device to receive, from the third meshnet device, an initiation network packet to be transmitted by the first meshnet device to the first LAN device, the initiation network packet indicating the alternate IP address as a destination address, as discussed elsewhere herein.

As shown by reference numeral 750, process 700 may include configuring the first meshnet device to transmit the initiation network packet to the first LAN device over a first LAN connection between the first meshnet device and the first LAN device. For instance, the infrastructure device may utilize the associated memory and/or processor to configure the first meshnet device to transmit the initiation network packet to the first LAN device over a first LAN connection between the first meshnet device and the first LAN device, as discussed elsewhere herein.

Process 700 may include additional aspects, such as any single aspect or any combination of aspects described below and/or in connection with one or more other processes described elsewhere herein.

In a first aspect, process 700 may include configuring the first meshnet device to calculate a first range of subnet IP addresses associated with the first LAN, and a second range of subnet IP addresses associated with the second LAN.

In a second aspect, alone or in combination with the first aspect, process 700 may include configuring the first meshnet device to compare a first range of subnet IP addresses associated with the first LAN with a second range of subnet IP addresses associated with the second LAN.

In a third aspect, alone or in combination with the first through second aspects, process 700 may include configuring the first meshnet device to determine that a first range of subnet IP addresses associated with the first LAN overlaps a second range of subnet IP addresses associated with the second LAN.

In a fourth aspect, alone or in combination with the first through third aspects, process 700 may include configuring the first meshnet device to determine the alternate IP address from among a pool of subnet IP addresses reserved for use by local area networks.

In a fifth aspect, alone or in combination with the first through fourth aspects, process 700 may include configuring the first meshnet device to receive, from the first LAN device, a response network packet to be transmitted to the third meshnet device.

In a sixth aspect, alone or in combination with the first through fifth aspects, process 700 may include configuring the first meshnet device to receive the initiation network packet in a communication that is encrypted with a cryptographic key associated with a meshnet connection between the first meshnet device and the third meshnet device.

Although FIG. 7 shows example blocks of the process, in some aspects, the process may include additional blocks, fewer blocks, different blocks, or differently arranged blocks than those depicted in FIG. 7. Additionally, or alternatively, two or more of the blocks of the process may be performed in parallel.

As indicated above, FIG. 7 is provided as an example. Other examples may differ from what is described with regard to FIG. 7.

FIG. 8 is an illustration of example devices 800 associated with conflict resolution to enable access to local network devices via mesh network devices, according to various aspects of the present disclosure. In some aspects, the example devices 800 may form part of or implement the systems, servers, environments, infrastructures, components, devices, or the like described elsewhere herein (e.g., MSP control infrastructure, VPN server, etc.) and may be used to perform example processes described elsewhere herein. The example devices 800 may include a universal bus 810 communicatively coupling a processor 820, a memory 830, a storage component 840, an input component 850, an output component 860, and a communication interface 870.

Bus 810 may include a component that permits communication among multiple components of a device 800. Processor 820 may be implemented in hardware, firmware, and/or a combination of hardware and software. Processor 820 may take the form of a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some aspects, processor 820 may include one or more processors capable of being programmed to perform a function. Memory 830 may include a random access memory (RAM), a read only memory (ROM), and/or another type of dynamic or static storage device (e.g., a flash memory, a magnetic memory, and/or an optical memory) that stores information and/or instructions for use by processor 820.

Storage component 840 may store information and/or software related to the operation and use of a device 800. For example, storage component 840 may include a hard disk (e.g., a magnetic disk, an optical disk, and/or a magneto-optic disk), a solid state drive (SSD), a compact disc (CD), a digital versatile disc (DVD), a floppy disk, a cartridge, a magnetic tape, and/or another type of non-transitory computer-readable medium, along with a corresponding drive.

Input component 850 may include a component that permits a device 800 to receive information, such as via user input (e.g., a touch screen display, a keyboard, a keypad, a mouse, a button, a switch, and/or a microphone). Additionally, or alternatively, input component 850 may include a component for determining location (e.g., a global positioning system (GPS) component) and/or a sensor (e.g., an accelerometer, a gyroscope, an actuator, another type of positional or environmental sensor, and/or the like). Output component 860 may include a component that provides output information from device 800 (via, for example, a display, a speaker, a haptic feedback component, an audio or visual indicator, and/or the like).

Communication interface 870 may include a transceiver-like component (e.g., a transceiver, a separate receiver, a separate transmitter, and/or the like) that enables a device 800 to communicate with other devices, such as via a wired connection, a wireless connection, or a combination of wired and wireless connections. Communication interface 870 may permit device 800 to receive information from another device and/or provide information to another device. For example, communication interface 870 may include an Ethernet interface, an optical interface, a coaxial interface, an infrared interface, a radio frequency (RF) interface, a universal serial bus (USB) interface, a Wi-Fi interface, a cellular network interface, and/or the like.

A device 800 may perform one or more processes described elsewhere herein. A device 800 may perform these processes based on processor 820 executing software instructions stored by a non-transitory computer-readable medium, such as memory 830 and/or storage component 840. As used herein, the term "computer-readable medium" may refer to a non-transitory memory device. A memory device may include memory space within a single physical storage device or memory space spread across multiple physical storage devices.

Software instructions may be read into memory 830 and/or storage component 840 from another computer-readable medium or from another device via communication interface 870. When executed, software instructions stored in memory 830 and/or storage component 840 may cause processor 820 to perform one or more processes described elsewhere herein. Additionally, or alternatively, hardware circuitry may be used in place of or in combination with software instructions to perform one or more processes described elsewhere herein. Thus, implementations described herein are not limited to any specific combination of hardware circuitry and software.

The quantity and arrangement of components shown in FIG. 8 are provided as an example. In practice, a device 800 may include additional components, fewer components, different components, or differently arranged components than those shown in FIG. 8. Additionally, or alternatively, a set of components (e.g., one or more components) of a device 800 may perform one or more functions described as being performed by another set of components of a device 800.

As indicated above, FIG. 8 is provided as an example. Other examples may differ from what is described with regard to FIG. 8.

Persons of ordinary skill in the art will appreciate that the aspects encompassed by the present disclosure are not limited to the particular exemplary aspects described herein. In that regard, although illustrative aspects have been shown and described, a wide range of modification, change, and substitution is contemplated in the foregoing disclosure. It is understood that such variations may be made to the aspects without departing from the scope of the present disclosure. Accordingly, it is appropriate that the appended claims be construed broadly and in a manner consistent with the present disclosure.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" or "device" is intended to be broadly construed as hardware, firmware, or a combination of hardware and software. As used herein, a processor is implemented in hardware, firmware, or a combination of hardware and software.

As used herein, satisfying a threshold may, depending on the context, refer to a value being greater than the threshold, greater than or equal to the threshold, less than the threshold, less than or equal to the threshold, equal to the threshold, or not equal to the threshold, among other examples, or combinations thereof.

It will be apparent that systems or methods described herein may be implemented in different forms of hardware, firmware, or a combination of hardware and software. The actual specialized control hardware or software code used to implement these systems or methods is not limiting of the aspects. Thus, the operation and behavior of the systems or methods were described herein without reference to specific software code-it being understood that software and hardware can be designed to implement the systems or methods based, at least in part, on the description herein.

Even though particular combinations of features are recited in the claims or disclosed in the specification, these combinations are not intended to limit the disclosure of various aspects. In fact, many of these features may be combined in ways not specifically recited in the claims or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (for example, a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A meshnet infrastructure device associated with a mesh network including a first meshnet device in communication with a second meshnet device and a third meshnet device, the first meshnet device being connected to a first local area network (LAN) and the second meshnet device being connected to a second LAN, the first meshnet device comprising:
 a memory; and
 a processor communicatively coupled to the memory, the memory and the processor being configured to:
  configure the first meshnet device to determine that a first subnet internet protocol (IP) address assigned to a first LAN device connected to the first LAN matches a second subnet IP address assigned to a second LAN device connected to the second LAN;
  configure the first meshnet device to map an association between an alternate IP address and the first subnet IP address based at least in part on determining that the first subnet IP address matches the second subnet IP address;
  configure the first meshnet device to transmit, to the third meshnet device, the association between the alternate IP address and the first subnet IP address;
  configure the first meshnet device to receive, from the third meshnet device, an initiation network packet to be transmitted by the first meshnet device to the first LAN device, the initiation network packet indicating the alternate IP address as a destination address; and
  configure the first meshnet device to transmit the initiation network packet to the first LAN device over a first LAN connection between the first meshnet device and the first LAN device.

2. The first meshnet device of claim 1, wherein the memory and the processor are configured to:
configure the first meshnet device to calculate a first range of subnet IP addresses associated with the first LAN, and a second range of subnet IP addresses associated with the second LAN.

3. The first meshnet device of claim 1, wherein the memory and the processor are configured to:
configure the first meshnet device to compare a first range of subnet IP addresses associated with the first LAN with a second range of subnet IP addresses associated with the second LAN.

4. The first meshnet device of claim 1, wherein the memory and the processor are configured to:
configure the first meshnet device to determine that a first range of subnet IP addresses associated with the first LAN overlaps a second range of subnet IP addresses associated with the second LAN.

5. The first meshnet device of claim 1, wherein the memory and the processor are configured to:
configure the first meshnet device to determine the alternate IP address from among a pool of subnet IP addresses reserved for use by local area networks.

6. The first meshnet device of claim 1, wherein the memory and the processor are configured to:
configure the first meshnet device to receive, from the first LAN device, a response network packet to be transmitted to the third meshnet device.

7. The first meshnet device of claim 1, wherein the memory and the processor are configured to:
configure the first meshnet device to receive the initiation network packet in a communication that is encrypted with a cryptographic key associated with a meshnet connection between the first meshnet device and the third meshnet device.

8. A method in a mesh network including a first meshnet device in communication with a second meshnet device and a third meshnet device in a mesh network, the first meshnet device being connected to a first local area network (LAN) and the second meshnet device being connected to a second LAN, the method comprising:
configuring the first meshnet device to determine that a first subnet internet protocol (IP) address assigned to a first LAN device connected to the first LAN matches a second subnet IP address assigned to a second LAN device connected to the second LAN;
configuring the first meshnet device to map an association between an alternate IP address and the first subnet IP address based at least in part on determining that the first subnet IP address matches the second subnet IP address;
configuring the first meshnet device to transmit, to the third meshnet device, the association between the alternate IP address and the first subnet IP address;
configuring the first meshnet device to receive, from the third meshnet device, an initiation network packet to be transmitted by the first meshnet device to the first LAN device, the initiation network packet indicating the alternate IP address as a destination address; and
configuring the first meshnet device to transmit the initiation network packet to the first LAN device over a first LAN connection between the first meshnet device and the first LAN device.

9. The method of claim 8, further comprising:
configuring the first meshnet device to calculate a first range of subnet IP addresses associated with the first LAN, and a second range of subnet IP addresses associated with the second LAN.

10. The method of claim 8, further comprising:
configuring the first meshnet device to compare a first range of subnet IP addresses associated with the first LAN with a second range of subnet IP addresses associated with the second LAN.

11. The method of claim 8, further comprising:
configuring the first meshnet device to determine that a first range of subnet IP addresses associated with the first LAN overlaps a second range of subnet IP addresses associated with the second LAN.

12. The method of claim 8, further comprising:
configuring the first meshnet device to determine the alternate IP address from among a pool of subnet IP addresses reserved for use by local area networks.

13. The method of claim 8, further comprising:
configuring the first meshnet device to receive, from the first LAN device, a response network packet to be transmitted to the third meshnet device.

14. The method of claim 8, further comprising:
configuring the first meshnet device to receive the initiation network packet in a communication that is encrypted with a cryptographic key associated with a meshnet connection between the first meshnet device and the third meshnet device.

15. A non-transitory computer-readable medium configured to store instructions, which when executed by a processor related to a meshnet infrastructure device associated with a first meshnet device in communication with a second meshnet device and a third meshnet device in a mesh network, the first meshnet device being connected to a first local area network (LAN) and the second meshnet device being connected to a second LAN, configure the processor to:
configure the first meshnet device to determine that a first subnet internet protocol (IP) address assigned to a first LAN device connected to the first LAN matches a second subnet IP address assigned to a second LAN device connected to the second LAN;
configure the first meshnet device to map an association between an alternate IP address and the first subnet IP address based at least in part on determining that the first subnet IP address matches the second subnet IP address;
configure the first meshnet device to transmit, to the third meshnet device, the association between the alternate IP address and the first subnet IP address;
configure the first meshnet device to receive, from the third meshnet device, an initiation network packet to be transmitted by the first meshnet device to the first LAN device, the initiation network packet indicating the alternate IP address as a destination address; and
configure the first meshnet device to transmit the initiation network packet to the first LAN device over a first LAN connection between the first meshnet device and the first LAN device.

16. The non-transitory computer-readable medium of claim 15, wherein the processor is configured to:
configure the first meshnet device to calculate a first range of subnet IP addresses associated with the first LAN, and a second range of subnet IP addresses associated with the second LAN.

17. The non-transitory computer-readable medium of claim 15, wherein the processor is configured to:

configure the first meshnet device to compare a first range of subnet IP addresses associated with the first LAN with a second range of subnet IP addresses associated with the second LAN.

18. The non-transitory computer-readable medium of claim 15, wherein the processor is configured to:
configure the first meshnet device to determine that a first range of subnet IP addresses associated with the first LAN overlaps a second range of subnet IP addresses associated with the second LAN.

19. The non-transitory computer-readable medium of claim 15, wherein the processor is configured to:
configure the first meshnet device to determine the alternate IP address from among a pool of subnet IP addresses reserved for use by local area networks.

20. The non-transitory computer-readable medium of claim 15, wherein the processor is configured to:
configure the first meshnet device to receive, from the first LAN device, a response network packet to be transmitted to the third meshnet device.

* * * * *